US012484052B2

(12) United States Patent
Jia et al.

(10) Patent No.: US 12,484,052 B2
(45) Date of Patent: Nov. 25, 2025

(54) METHODS FOR CONFIGURING AND ACQUIRING SYSTEM INFORMATION AND APPARATUSES THEREOF

(71) Applicant: FUJITSU LIMITED, Kawasaki (JP)

(72) Inventors: Meiyi Jia, Beijing (CN); Guorong Li, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 380 days.

(21) Appl. No.: 18/104,346

(22) Filed: Feb. 1, 2023

(65) Prior Publication Data

US 2023/0180227 A1 Jun. 8, 2023

Related U.S. Application Data

(63) Continuation of application No. PCT/CN2020/107581, filed on Aug. 6, 2020.

(51) Int. Cl.
*H04W 72/1268* (2023.01)
*H04W 84/04* (2009.01)

(52) U.S. Cl.
CPC ...... *H04W 72/1268* (2013.01); *H04W 84/042* (2013.01)

(58) Field of Classification Search
CPC ........... H04W 72/1268; H04W 84/042; H04W 48/14; H04W 48/12; H04W 36/00
See application file for complete search history.

(56) References Cited

U.S. PATENT DOCUMENTS

| | | | |
|---|---|---|---|
| 2016/0330679 A1 | 11/2016 | Zhang et al. | |
| 2017/0318478 A1 | 11/2017 | Basu Mallick et al. | |
| 2018/0041997 A1* | 2/2018 | Babaei | H04W 52/40 |
| 2018/0132168 A1 | 5/2018 | Ingale et al. | |
| 2020/0008224 A1* | 1/2020 | Ozturk | H04W 56/001 |
| 2020/0015291 A1 | 1/2020 | Shi et al. | |
| 2020/0045658 A1* | 2/2020 | Nam | H04W 56/001 |
| 2020/0052768 A1* | 2/2020 | Agiwal | H04W 72/046 |
| 2020/0187100 A1 | 6/2020 | Kim et al. | |
| 2020/0396654 A1* | 12/2020 | Freda | H04W 36/0061 |
| 2022/0159632 A1* | 5/2022 | Xiong | H04L 5/0044 |
| 2023/0060444 A1* | 3/2023 | Uesaka | H04W 72/23 |

FOREIGN PATENT DOCUMENTS

| | | |
|---|---|---|
| CN | 105850185 A | 8/2016 |
| CN | 107113657 A | 8/2017 |
| CN | 107645730 A | 1/2018 |
| CN | 110024442 A | 7/2019 |

(Continued)

OTHER PUBLICATIONS

First Notification of Office Action and Search Report issued by the China National Intellectual Property Administration for corresponding Chinese Patent Application No. 202080104343.6, mailed on Oct. 18, 2024, with an English translation.

(Continued)

*Primary Examiner* — Afshawn M Towfighi
(74) *Attorney, Agent, or Firm* — Myers Wolin, LLC

(57) ABSTRACT

Methods for configuring and acquiring system information and apparatuses thereof. The method for configuring includes: generating scheduling information based on a correlation between a system information area identity and an area scope; and transmitting the scheduling information.

6 Claims, 12 Drawing Sheets

(56) References Cited

FOREIGN PATENT DOCUMENTS

| CN | 110431887 A | 11/2019 |
| CN | 111357327 A | 6/2020 |

OTHER PUBLICATIONS

International Search Report and Written Opinion of the International Searching Authority issued by the China National Intellectual Property Administration for corresponding International Patent Application No. PCT/CN2020/107581, mailed on Apr. 30, 2021, with an English translation.
3GPP TS 38.331 V15.10.0, "3rd Generation Partnership Project; Technical Specification Group Radio Access Network; NR; Radio Resource Control (RRC) protocol specification (Release 15)", Jul. 2020.

\* cited by examiner

1201 for a terminal equipment-specific parameter, when a presence condition includes that a serving cell is configured with a supplementary uplink, taking a capability of the terminal equipment into account by the network device, or, for a terminal equipment-specific parameter and a cell-specific parameter, when the presence condition includes that a serving cell is configured with a supplementary uplink, not taking a capability of the terminal equipment into account or taking only that a network device provides SUL (Supplementary Uplink) configuration for the terminal equipment into account by the network device

FIG. 12

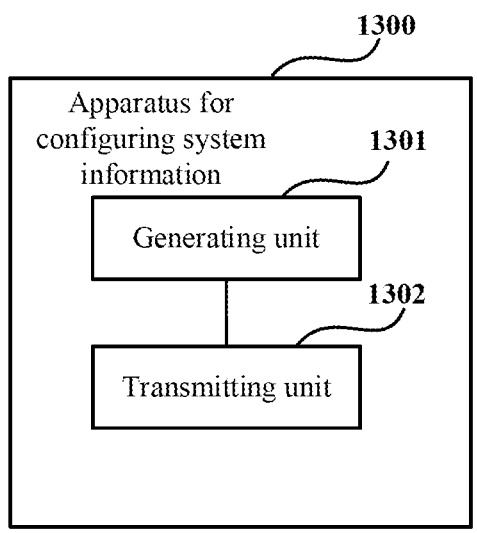

FIG. 13

METHODS FOR CONFIGURING AND ACQUIRING SYSTEM INFORMATION AND APPARATUSES THEREOF

CROSS-REFERENCE TO RELATED APPLICATION

This application is a continuation application of International Application PCT/CN2020/107581 filed on Aug. 6, 2020 and designated the U.S., the entire contents of which are incorporated herein by reference.

TECHNICAL FIELD

This disclosure relates to the field of communications.

BACKGROUND

In New Radio (NR), before establishing communication, a terminal equipment needs to apply a system information acquisition process to obtain access layer (AS) and non-access layer (NAS) information. The system information acquisition process is applicable to a terminal equipment in an idle state, an unconnected state and a connected state. FIG. 1 is a schematic diagram of the system information acquisition process in NR. As shown in FIG. 1, the process includes: acquiring a master information block (MIB, MasterInformationBlock) by the terminal equipment; acquiring system information block 1 (SIB1, SystemInformationBlockType1) by the terminal equipment; and when needed, transmitting a system information request (SystemInformationRequest) by the terminal equipment to a network device to request the network device to broadcast system information messages (SystemInformation messages), and acquiring the system information message.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In NR, a stored system information block is introduced. Using this method, the terminal equipment is able to store acquired SIBs. In addition to MIB, SIB1, SIB6 (SystemInformationBlockType6), SIB7 (SystemInformationBlockType7) or SIB8 (SystemInformationBlockType8), the terminal equipment may use a valid version of the stored system information for other needed SIBs, such as after cell reselection or when returning from outside the coverage range or after receiving a system information (SI) modification instruction.

In cell selection (such as turning on), cell reselection, turning back from no coverage, after completion of synchronization reconfiguration, after entering a network from another RAT, in receiving an indication on a system information change, in receiving a PWS notification, or in receiving a request from an upper layer (such as in receiving a positioning request), the terminal equipment will apply a system information acquisition process, acquiring MIB and SIB1 first and storing the acquired MIB and SIB1. For the needed SIB, the terminal equipment may check whether a valid version of the SIB is stored. when a valid version of the SIB is stored, the stored version may be used; and once the terminal does not store a valid version of the SIB, the terminal equipment obtains the SIB. In addition, the terminal equipment may store the acquired SIB, and store associated information of the SIB, including an area scope (areaScope), a public land mobile network identity (PLMN-identity), a system information area identity (systemInformationAreaID), and a cell identity (cellIdentity).

For the needed SIB, the terminal equipment may check whether a valid version is stored.

For example, for a stored version of the SIB, when the stored version of the SIB is associated with "an area scope (areaScope)", when the terminal equipment does not have an NPN (non-public network) capability or a serving cell is not an NPN-only cell, when a system information area identity and a value tag (valueTag) associated with the SIB in system scheduling information (si-ScheduleingInfo, also referred to as scheduling information) and a public land mobile network identity (PLMN-Identity) in other information are identical to a system information area identity, a value tag and a public land mobile network identity associated with the stored version of the SIB, the terminal equipment considers that the stored version is valid, otherwise, it considers that the stored version is invalid; and when the terminal equipment has an NPN capability and the serving cell is an NPN-only cell, when the system information area identity and the value tag (valueTag) associated with the SIB in the system scheduling information and NPN identity (NPN-Identity) in other information are identical to the system information area identity, the value tag and the public land mobile network identity associated with the stored version of the SIB, the terminal equipment considers that the stored version is valid, otherwise, it considers that the stored version is invalid.

If the stored version of the SIB is not associated with "an area scope (areaScope)", when the terminal equipment does not have the NPN capability or the serving cell is not an NPN-only cell, when the value tag associated with the SIB in the system scheduling information, the public land mobile network identity in the other information and a cell identity are identical to a value tag, a public land mobile network identity and a cell identity associated with the stored version, the terminal equipment considers that the stored version is valid, otherwise, it considers that the stored version is invalid; and when the terminal equipment has an NPN capability and the serving cell is an NPN-only cell, when the value tag associated with the SIB in the system scheduling information, an NPN identity and a cell identity in the other information are identical to the value tag, an NPN identity and a cell identity associated with the stored version, the terminal equipment considers that the stored version is valid, otherwise, it considers that the stored version is invalid.

It was found by the inventors that based on the current mechanism, when an SIB is configured with "areaScope" in the system scheduling information (si-SchedulingInfo) of the serving cell, the terminal equipment checks the system information area identity and other information in the system scheduling information to determine validity of the stored version.

However, the system information area identity is optional information, that is, in some scenarios, the network side may possibly not provide this information. In this case, for an SIB associated with "areaScope", behaviors of the terminal equipment are uncertain. For example, the terminal equipment may possibly not be able to determine whether the stored version of the SIB is valid, or the terminal equipment may possibly consider that all stored versions of the SIB are invalid or that multiple stored versions are valid. This will cause test errors of the terminal equipment and increase test costs, and may also increase power consumption of the terminal equipment.

In order to solve one or more of the above problems, embodiments of this disclosure provide methods for configuring and acquiring system information and apparatuses thereof, in which a network device generates scheduling information based on a correlation between a system information area identity and an area scope, or when a terminal equipment checks validity of a stored version of an SIB, behaviors of the terminal equipment in case of configuring or not configuring a system information area identity are specified. Hence, uncertainty of the behaviors of the terminal equipment may be avoided, and complexity of test and overhead of the terminal equipment may be lowered.

According to a first aspect of the embodiments of this disclosure, there is provided an apparatus for configuring system information, applicable to a network device, the apparatus including: a generating unit configured to generate scheduling information (SchedulingInfo) based on a correlation between a system information area identity (systemInformationAreaID) and an area scope (areaScope); and a transmitting unit configured to transmit the scheduling information.

According to a second aspect of the embodiments of this disclosure, there is provided an apparatus for acquiring system information, applicable to a terminal equipment, the apparatus including: a first acquiring unit configured to acquire scheduling information, the scheduling information being generated based on a correlation between a system information area identity (systemInformationAreaID) and an area scope (areaScope).

According to a third aspect of the embodiments of this disclosure, there is provided an apparatus for acquiring system information, applicable to a terminal equipment, the apparatus including: a fourth determining unit configured to, for a stored version of an SIB, when obtained scheduling information comprises an area scope (areaScope) corresponding to the SIB, the scheduling information comprises a system information area identity (systemInformation-AreaID) and first information are identical to a system information area identity and corresponding information associated with the stored version, consider that the stored version is valid.

According to a fourth aspect of the embodiments of this disclosure, there is provided a network device, including the apparatus as described in the first aspect of the embodiments of this disclosure.

According to a fifth aspect of the embodiments of this disclosure, there is provided a terminal equipment, including the apparatus as described in the second or third aspect of the embodiments of this disclosure.

According to a sixth aspect of the embodiments of this disclosure, there is provided a communication system, including the network device as described in the fourth aspect of the embodiments of this disclosure and/or the terminal equipment as described in the fifth aspect of the embodiments of this disclosure.

According to a seven aspect of the embodiments of this disclosure, there is provided a method for configuring system information, applicable to a network device, the method including: generating scheduling information (SchedulingInfo) based on a correlation between a system information area identity (systemInformationAreaID) and an area scope (areaScope); and transmitting the scheduling information.

According to an eighth aspect of the embodiments of this disclosure, there is provided a method for acquiring system information, applicable to a terminal equipment, the method including: acquiring scheduling information, the scheduling information being generated based on a correlation between a system information area identity (systemInformationAreaID) and an area scope (areaScope).

According to a ninth aspect of the embodiments of this disclosure, there is provided a method for acquiring system information, applicable to a terminal equipment, the method including: for a stored version of an SIB, when obtained scheduling information includes an area scope (areaScope) corresponding to the SIB, the scheduling information comprises a system information area identity (systemInformationAreaID) and first information are identical to a system information area identity and corresponding information associated with the stored version, considering by the terminal equipment that the stored version is valid.

According to a tenth aspect of the embodiments of this disclosure, there is provided a computer readable program code, which, when executed in an apparatus for configuring system information or a network device, will cause the apparatus for configuring system information or the network device to carry out the method for configuring system information as described in the seventh aspect of the embodiments of this disclosure.

According to an eleventh aspect of the embodiments of this disclosure, there is provided a computer readable medium, including a computer readable program code, which will cause an apparatus for configuring system information or a network device to carry out the method for configuring system information as described in the seventh aspect of the embodiments of this disclosure.

According to a twelfth aspect of the embodiments of this disclosure, there is provided a computer readable program code, which, when executed in an apparatus for acquiring system information or a terminal equipment, will cause the apparatus for acquiring system information or the terminal equipment to carry out the method for acquiring system information as described in the eighth or ninth aspect of the embodiments of this disclosure.

According to a thirteenth aspect of the embodiments of this disclosure, there is provided a computer readable medium, including a computer readable program code, which will cause an apparatus for acquiring system information or a terminal equipment to carry out the method for acquiring system information as described in the eighth or ninth aspect of the embodiments of this disclosure.

An advantage of the embodiments of this disclosure exists in that the network device generates the scheduling information based on the correlation between the system information area identity and the area scope, or when the terminal equipment checks validity of the stored version of an SIB, behaviors of the terminal equipment in case of configuring or not configuring a system information area identity are specified. Hence, uncertainty of the behaviors of the terminal equipment may be avoided, and complexity of test and overhead of the terminal equipment may be lowered.

In addition, after the terminal equipment obtains the MIB and SIB1, when necessary, the terminal equipment may transmit a system information request message to the network device to request the network to broadcast a system information message.

In order to ensure transmission of the system information request message, the network device may provide the following configurations that:

SIB1 only includes si-RequestConfigSUL;
SIB1 only includes si-RequestConfig;

SIB1 includes si-RequestConfigSUL and si-RequestConfig; and

SIB1 does not include si-RequestConfigSUL and si-RequestConfig.

Likewise, for positioning system information, network device may provide the following configurations that:

SIB1 only includes posSI-RequestConfigSUL-R16;

SIB1 only includes posSI-RequestConfig-r16;

SIB1 includes posSI-RequestConfigSUL-R16 and posSI-RequestConfigSUL-R16; and

SIB1 does not include posSI-RequestConfigSUL-R16 and posSI-RequestConfigSUL-R16.

Where, si-RequestConfig and posSI-RequestConfigSUL-r16 are configurations on a normal uplink (NUL) for requesting system information messages, and si-RequestConfigSUL and posSI-RequestConfigSUL-r16 are configurations on a supplementary uplink (SUL) for requesting system information messages.

It was further found by the inventors that according to the current mechanism, when the serving cell is configured with supplementary uplink and when a system information (SchedulingInfo) broadcast status (such as si-BroadcastStatus, posSI-BroadcastStatus) of any system information message (SI-message) in the scheduling information (SchedulingInfo) is set to be "not broadcasting (notBroadcasting)", configurations (such as si-RequestConfigSUL, posSI-RequestConfigSUL-R16) on the supplementary uplink for transmitting system information messages may be optionally present; otherwise, si-RequestConfigSUL is vacant. Therefore, in order to determine whether to provide si-RequestConfigSUL or posSI-RequestConfigSUL-R16, the network device needs to learn whether the serving cell is configured with supplementary uplink.

According to the current mechanism, when the network device provides the SUL configuration, capabilities of the terminal equipment (such as a supported frequency band, a supported uplink channel bandwidth, etc.) are taken into account and the terminal equipment is able to support the SUL frequency band indicated in the SUL configuration, the terminal equipment considers that the serving cell configures the supplementary uplink. Although the network device is able to learn whether it has provided the SUL configuration, the network may possibly not be able to determine the capabilities of the terminal equipment, because the terminal equipment camping on the cell may possibly not have indicated its terminal equipment capabilities to the network device; or, even when all terminal equipments provide terminal equipment capabilities, for a SUL configuration, some terminal equipments under the serving cell may be able to support the configuration, and some terminal equipments may be unable to support the configuration. Therefore, the network device is unable to determine whether the serving cell configures the supplementary uplink, and it is unable to determine whether SIB1 includes si-RequestConfigSUL or posSI-RequestConfigSUL-R16.

In order to solve one or more of the above problems, embodiments of this disclosure further provide a method for configuring system information and an apparatus thereof, in which for a terminal equipment-specific parameter, when a presence condition includes that the serving cell configures supplementary uplink, capabilities of the terminal equipment are taken into account, or for a terminal equipment-specific parameter and a cell-specific parameter, when a presence condition includes that the serving cell configures supplementary uplink, capabilities of the terminal equipment are not taken into account, or that the network device provides SUL configuration for the terminal equipment is only taken into account. In this way, the network device is able to specify contents in SIB1, uncertainty of implementations of the network device may be avoided, and testing costs of network device products may be lowered, thereby saving networking costs.

According to a fourteenth aspect of the embodiments of this disclosure, there is provided an apparatus for configuring system information, applicable to a network device, the apparatus including: a configuring unit configured to, for a terminal equipment-specific parameter, when a presence condition comprises that a serving cell is configured with a supplementary uplink, take a capability of the terminal equipment into account, or, for a terminal equipment-specific parameter and a cell-specific parameter, when the presence condition includes that a serving cell is configured with a supplementary uplink, not to take a capability of the terminal equipment into account or take only that a network device provides SUL (Supplementary Uplink) configuration for the terminal equipment into account.

According to a fifteenth aspect of the embodiments of this disclosure, there is provided a network device, including the apparatus as described in the fourteenth aspect of the embodiments of this disclosure.

According to a sixteenth aspect of the embodiments of this disclosure, there is provided a communication system, including the network device as described in the fifteenth aspect of the embodiments of this disclosure.

According to a seventeenth aspect of the embodiments of this disclosure, there is provided a method for configuring system information, applicable to a network device, the method including:

for a terminal equipment-specific parameter, when a presence condition comprises that a serving cell is configured with a supplementary uplink, taking a capability of the terminal equipment into account, or, for a terminal equipment-specific parameter and a cell-specific parameter, when the presence condition includes that a serving cell is configured with a supplementary uplink, not taking a capability of the terminal equipment into account or taking only that a network device provides SUL (Supplementary Uplink) configuration for the terminal equipment into account.

According to an eighteenth aspect of the embodiments of this disclosure, there is provided a computer readable program code, which, when executed in an apparatus for configuring system information or a network device, will cause the apparatus for configuring system information or the network device to carry out the method for configuring system information as described in the seventeenth aspect of the embodiments of this disclosure.

According to a nineteenth aspect of the embodiments of this disclosure, there is provided a computer readable medium, including a computer readable program code, which will cause an apparatus for configuring system information or a network device to carry out the method for configuring system information as described in the seventeenth aspect of the embodiments of this disclosure.

Another advantage of the embodiments of this disclosure exists in that for a terminal equipment-specific parameter, when a presence condition includes that the serving cell configures supplementary uplink, capabilities of the terminal equipment are taken into account, or for a terminal equipment-specific parameter and a cell-specific parameter, when a presence condition includes that the serving cell configures supplementary uplink, capabilities of the terminal equipment are not taken into account, or that the network device provides SUL configuration for the terminal equipment is only taken into account. In this way, the network device is able to specify contents in SIB1, uncertainty of implementations of the network device may be avoided, and testing costs of network device products may be lowered, thereby saving networking costs.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 12 is a schematic diagram of the method for configuring system information of Embodiment 5 of this disclosure;

FIG. 13 is a schematic diagram of the apparatus for configuring system information of Embodiment 6 of this disclosure;

DETAILED DESCRIPTION

Figure 1:
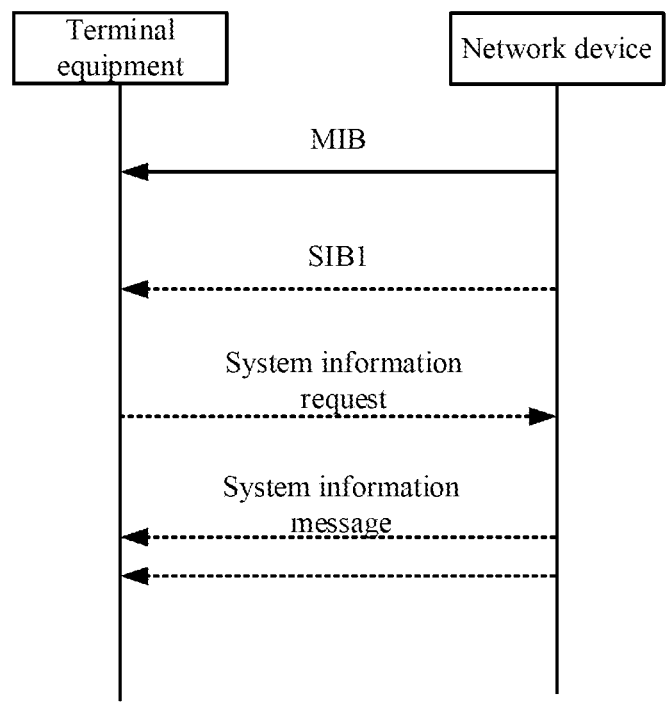
FIG. 1 is schematic diagram of a system information acquisition process in NR.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first," and "second," etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments of this disclosure, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In the embodiments of this disclosure, all of "when . . . ", "in a case where . . . ", "for a case where . . . " and "if . . . " denote one or some conditions or states, and furthermore, all of these expressions are interchangeable.

Scenarios of the embodiments of this disclosure shall be described below by way of examples; however, this disclosure is not limited thereto.

Figure 2:
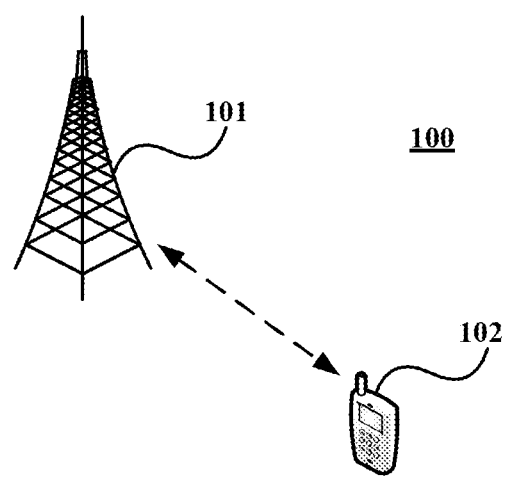
FIG. 2 is a schematic diagram of a communication system of an embodiment of this disclosure.

FIG. 2 is a schematic diagram of a communication system of an embodiment of this disclosure, schematically showing a case where a terminal equipment and a network device are taken as an example. As shown in FIG. 2, the communication system 100 may include: network device 101 and terminal equipment 102. For the sake of simplicity, FIG. 2 illustrates only one terminal equipment. The network device 101 is, for example, a network device gNB of NR.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

Based on the current mechanism, the terminal equipment 102 verifies whether there exists a valid stored version of a system information block. For a stored version of an SIB, when the stored version of the SIB is associated with "areaScope" and its value is identical to "areaScope" value of the SIB received in system scheduling information (si-SchedulingInfo) of a serving cell, the terminal equipment 102 checks whether a system information area identity and other information in the system scheduling information are in consistence with corresponding information associated with the stored version of the SIB; and when the stored version of the SIB does not have "areaScope" and the system scheduling information of the serving cell does not include the "areaScope" value of the SIB, the terminal equipment 102 checks whether the cell identity and other information are in consistence with the corresponding information associated with the stored version of the SIB.

However, the system information area identity is optional information, that is, in some scenarios, the network device 101 may possibly not provide this information. For example, after the terminal equipment 102 performs cell reselection, it finds that the system scheduling information does not include the system information area identity; or, when the terminal equipment 102 turns back from outside the coverage range, it finds that the system scheduling information does not include the system information area identity; or, after the network device 101 transmits an SI modification indication, it updates the system scheduling information, which does not include the system information area identity.

In these cases, for an SIB associated with "areaScope", the following problems may possibly exist:

the terminal equipment 102 is unable to determine whether the stored version of the SIB is valid, resulting in uncertainty of the behaviors of the terminal equipment 102 and test errors of the terminal equipment 102; or, the terminal equipment 102 may possibly consider that all stored versions of the SIB are invalid, hence, the terminal equipment 102 is needed to reacquire the SIB again; and reacquiring the SIB when the SIB is not changed will cause unnecessary power consumption of the terminal equipment, which is undesirable for the terminal equipment that needs energy saving; or, when other information than the system information area identity is consistent, the terminal equipment 102 may possibly consider that the associated stored version is valid, which may cause multiple stored versions to be valid, so that the terminal equipment 102 is unable to determine which version to be used or use an invalid stored version.

For example, for a system information block SIBx other than SIB1, SIB6, SIB7 or SIB8, the terminal equipment 102 has a stored version 1, which is associated with "areaScope", and corresponding stored information includes a public land mobile network identity 1, a system information area identity 1, and a cell identity 1; and the terminal equipment 102 also has a stored version 2, which is associated with "areaScope", and corresponding stored information includes a public land mobile network identity 1, a system information area identity 2, and a cell identity 2. when the "areaScope" of SIBx is received in the scheduling information of the serving cell, but the scheduling information does not include the system information area identity, according to the current mechanism, the terminal equipment 102 may consider that there exists an error due to that the system information area identities are unable to be compared; or, the terminal equipment 102 considers that both the stored version 1 and stored version 2 are not valid, so it is needed to reacquire the SIBx; or, when the terminal equipment 102 considers that both stored version 1 and stored version 2 are valid, it is unable to determine which version to be used or select the stored version 1 (or the stored version 2), but in fact, this version is invalid.

Various implementations of the embodiments of this disclosure shall be described below with reference to the accompanying drawings. These implementations are illustrative only, and are not intended to limit this disclosure.

Embodiment 1

The embodiment of this disclosure provides a method for configuring system information, applicable to a network device, such as the network device 101 shown in FIG. 2.

Figure 3:
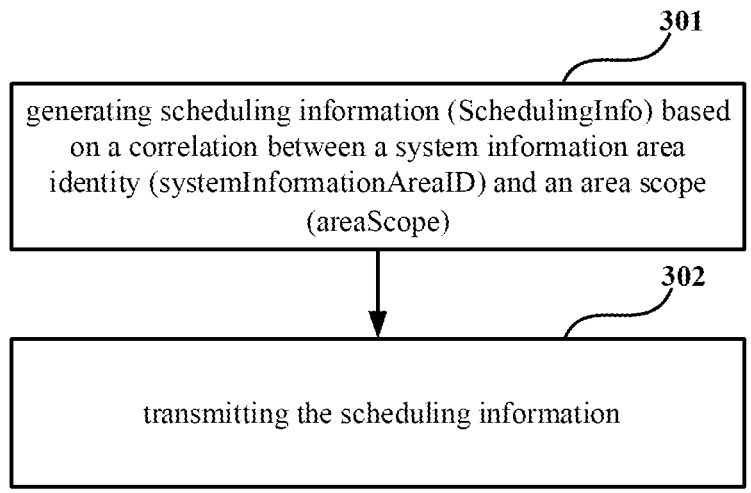
FIG. 3 is a schematic diagram of the method for configuring system information of Embodiment 1 of this disclosure.

FIG. 3 is a schematic diagram of the method for configuring system information of Embodiment 1 of this disclosure. As shown in FIG. 3, the method includes:
  step 301: generating scheduling information (SchedulingInfo) based on a correlation between a system information area identity (systemInformationAreaID) and an area scope (areaScope); and
  step 302: transmitting the scheduling information.

In this way, the network device generates the scheduling information based on the correlation between a system information area identity and an area scope. Hence, uncertainty of behaviors of the terminal equipment may be avoided, and complexity of test and overhead of the terminal equipment may be lowered.

In step 301, the network device generates the scheduling information based on the correlation between the system information area identity and the area scope. In the embodiment of this disclosure, the scheduling information may also be referred to as system scheduling information (si-SchedulingInfo).

For example, the scheduling information is included in SIB1.

In the embodiment of this disclosure, when the scheduling information includes the system information area identity, the system information area identity is applicable to all cell-specific SIBs, that is, SIBs configured with the area scope are associated with identical system information area identities.

In the embodiment of this disclosure, when the scheduling information includes the area scope, the area scope corresponds to an SIB, that is, the scheduling information may include one or more area scopes corresponding to an SIB.

When the scheduling information includes the area scope corresponding to an SIB, it means that the SIB supports area specificity. That is, the SIB is valid in multiple cells in the area. When the scheduling information does not include the area scope corresponding to an SIB, it means that the SIB does not support area specificity. That is, the SIB is only valid in cells that provide the SIB.

In the embodiment of this disclosure, the scheduling information is generated based on the correlation between the system information area identity and the area scope. For example, the scheduling information may simultaneously include the system information area identity and the area scope, or the scheduling information may not simultaneously include the system information area identity and the area scope, or the scheduling information may include the system information area identity but may not include the area scope.

How to generate the scheduling information based on the correlation between the system information area identity and the area scope shall be exemplified below.

Figure 4:
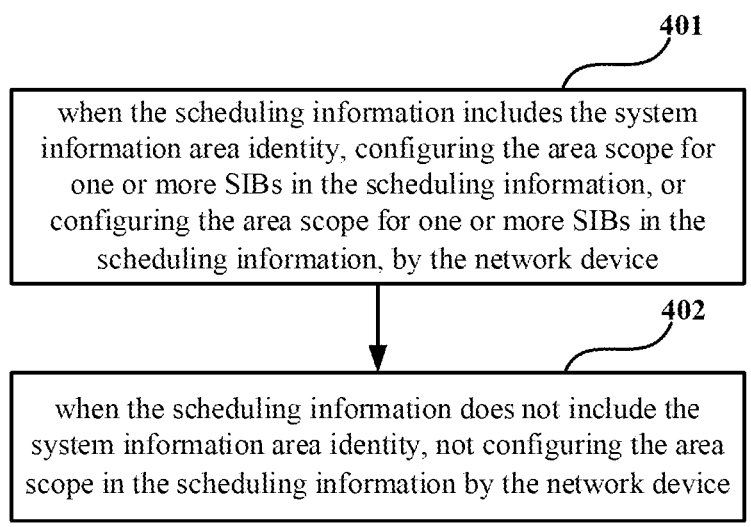
FIG. 4 is a schematic diagram of the method for generating scheduling information of Embodiment 1 of this disclosure.

FIG. 4 is a schematic diagram of the method for generating scheduling information of Embodiment 1 of this disclosure. As shown in FIG. 4, the method includes:
  step 401: when the scheduling information includes the system information area identity, configuring the area scope for one or more SIBs in the scheduling information, or configuring the area scope for one or more SIBs in the scheduling information, by the network device; and
  step 402: when the scheduling information does not include the system information area identity, not configuring the area scope in the scheduling information by the network device.

That is, when the scheduling information includes the system information area identity, the network device may configure the area scope for one or more SIBs in the scheduling information or optionally configure the area scope for one or more SIBs in the scheduling information; otherwise, it does not configure the area scope.

In step 401, that the network device configures the area scope for one or more SIBs in the scheduling information refers to mandatorily configuring the area scope for one or more SIBs in the scheduling information.

In the embodiment of this disclosure, the SIB may be at least one of SIB2, SIB3, SIB4 and SIB5, and furthermore, the SIB may be at least one of SIB9, SIB10, SIB11, SIB12, SIB13 and SIB14.

In the embodiment of this disclosure, correspondingly, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is optionally present. That is, when the scheduling information includes the system information area identity, the area scope field is mandatory present; otherwise, the area scope field is absent.

Or, a necessary coding condition of the system information area identity field in the scheduling information is that: when the scheduling information includes the system information area identity, the area scope field is optionally present; and when the scheduling information does not include the system information area identity, the area scope field is absent. That is, when the scheduling information includes the system information area identity, the area scope field is mandatory present; otherwise, the area scope field is absent.

That is, the areaScope field is conditionally present based on the systemInformationAreaID field, i.e. the condition SI-Area-ID may be defined by Table 1 or Table 2 below.

TABLE 1

| Conditional presence | Explanation |
| --- | --- |
| SI-Area-ID | The field is mandatory present, if the filed systemInformationAreaID is included. It is absent otherwise. |

TABLE 2

| Conditional presence | Explanation |
| --- | --- |
| SI-Area-ID | The field is optionally mandatory present, if the filed systemInformationAreaID is included. It is absent otherwise. |

In the embodiment of this disclosure, the condition SI-Area-ID is only an exemplary name, which may also be expressed by other names, such as a condition SIAreaID or a condition SI_AID, etc.

In this way, only when the system information area identity is configured, the network will configure the area scope for one or more SIBs to support area-specific SIBs. Hence, when the terminal equipment checks validity of a stored version of an SIB, for the SIB configured with the area scope, it must be able to check whether the system information area identity in the scheduling information is in consistence with the system information area identity associated with the stored version. In addition, this method allows the network device to optionally configure the area scope when the system information area identity is configured, thereby ensuring flexibility of network configuration.

In addition, in this method, in a case where the system information area identity is not configured, the network does not configure the area scope and does not support the area-specific SIB. Hence, signaling overhead and spectrum resources may be saved.

Figure 5:
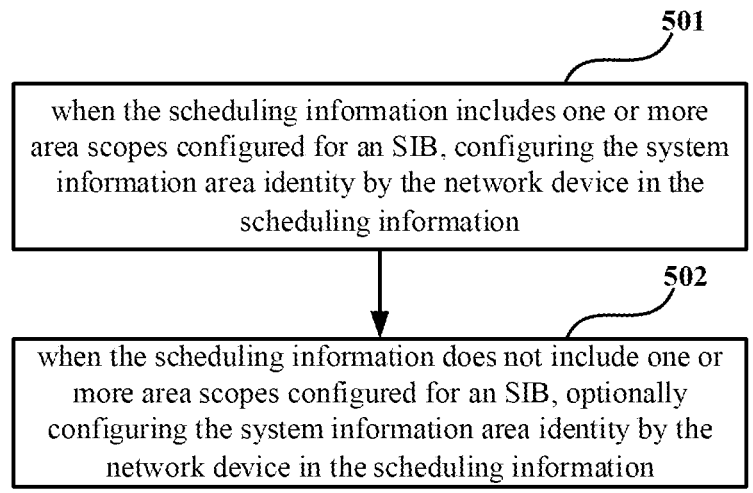
FIG. 5 is another schematic diagram of the method for generating scheduling information of Embodiment 1 of this disclosure.

FIG. 5 is another schematic diagram of the method for generating scheduling information of Embodiment 1 of this disclosure. As shown in FIG. 5, the method includes:

step 501: when the scheduling information includes one or more area scopes configured for an SIB, configuring the system information area identity by the network device in the scheduling information; and step 502: when the scheduling information does not include one or more area scopes configured for an SIB, optionally configuring the system information area identity by the network device in the scheduling information.

That is, when the scheduling information includes one or more area scopes configured for an SIB, the network device will configure the system information area identity in the scheduling information; otherwise, the network device will optionally configure the system information area identity in the scheduling information.

In the embodiment of this disclosure, the SIB may be at least one of SIB2, SIB3, SIB4 and SIB5. In addition, the SIB may also be at least one of SIB9, SIB10, SIB11, SIB12, SIB13 and SIB14.

In the embodiment of this disclosure, correspondingly, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is optionally present. That is, when the scheduling information includes the area scope configured for one SIB, the system information area identity field is mandatory present; otherwise, the system information area identity field is optionally present.

That is, the system information area identity field (systemInformationAreaID field) is conditionally present based on the AreaScope field, i.e. the condition AreaScope may be defined by Table 3 below.

TABLE 3

| Conditional presence | Explanation |
| --- | --- |
| AreaScope | The field is mandatory present, if the filed areaScope is included for any SIB. It is optionally present, Need R, otherwise |

In the embodiment of this disclosure, the condition AreaScope is only an exemplary name, which may also be expressed by other names, such as a condition Area-Scope or a condition Area_Scope, etc.

In this way, when one or more SIBs are configured with an area scope, that is, area-specific SIBs are supported, the network device necessarily configures the system information area identity, so as to determine an area of the system information where the serving cell is located. Hence, when the terminal equipment checks validity of a stored version of an SIB, for the SIB configured with the area scope, whether the system information area identity in the scheduling information is in consistence with the system information area identity associated with the stored version is necessarily able to be checked.

In addition, in this method, the network may optionally configure the system information area identity when the area scope is not configured, that is, an area-specific SIB is not supported, thereby ensuring flexibility of network configuration.

Figure 6:
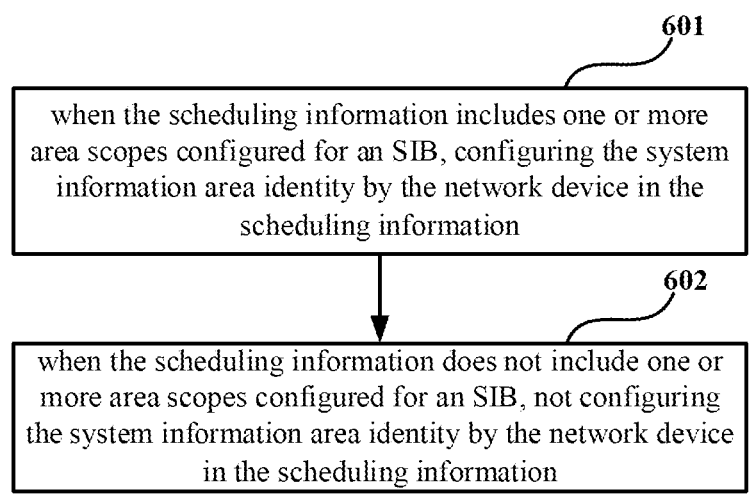
FIG. 6 is a further schematic diagram of the method for generating scheduling information of Embodiment 1 of this disclosure.

FIG. 6 is a further schematic diagram of the method for generating scheduling information of Embodiment 1 of this disclosure. As shown in FIG. 6, the method includes:

step 601: when the scheduling information includes one or more area scopes configured for an SIB, configuring the system information area identity by the network device in the scheduling information; and step 602: when the scheduling information does not include one or more area scopes configured for an SIB, not configuring the system information area identity by the network device in the scheduling information.

That is, when the scheduling information includes one or more area scopes configured for an SIB, the network device will configure the system information area identity in the scheduling information; otherwise, the network device will not configure the system information area identity in the scheduling information.

In the embodiment of this disclosure, the SIB may be at least one of SIB2, SIB3, SIB4 and SIB5. In addition, the SIB may also be at least one of SIB9, SIB10, SIB11, SIB12, SIB13 and SIB14.

In the embodiment of this disclosure, correspondingly, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is absent. That is, when the scheduling information includes the area scope configured for one SIB, the system information area identity field is mandatory present; otherwise, the system information area identity field is absent.

That is, the system information area identity field (systemInformationAreaID field) is conditionally present based on the AreaScope field, i.e. the condition AreaScope may be defined by Table 4 below.

TABLE 4

| Conditional presence | Explanation |
|---|---|
| AreaScope | The field is mandatory present, if the filed areaScope is included for any SIB. It is absent otherwise. |

In the embodiment of this disclosure, the condition AreaScope is only an exemplary name, which may also be expressed by other names, such as a condition Area-Scope or a condition Area Scope, etc.

In this way, when one or more SIBs are configured with an area scope, that is, area-specific SIBs are supported, the network device necessarily configures the system information area identity, so as to determine an area of the system information where the serving cell is located. Hence, when the terminal equipment checks validity of a stored version of an SIB, for the SIB configured with the area scope, whether the system information area identity in the scheduling information is in consistence with the system information area identity associated with the stored version is necessarily able to be checked.

In addition, in this method, in a case where the area scope is not configured, that is, the area-specific SIB is not supported, the network device will not configure the system information area identity. Hence, signaling overhead and spectrum resources may be saved.

After the scheduling information is generated in step 301, the network device may transmit the generated scheduling information by broadcast in step 302.

For example, the scheduling information is included in SIB1, referring to FIG. 1, the network device transmits SIB1 by broadcast.

It can be seen from the above embodiment that the network device generates the scheduling information based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 2

The embodiment of this disclosure provides a method for acquiring system information. This method is applicable to a terminal equipment, and corresponds to the method for configuring system information applicable to a network device described in Embodiment 1, with identical contents being not going to be repeated any further. For example, the method is applicable to the terminal equipment 102 in FIG. 2.

Figure 7:
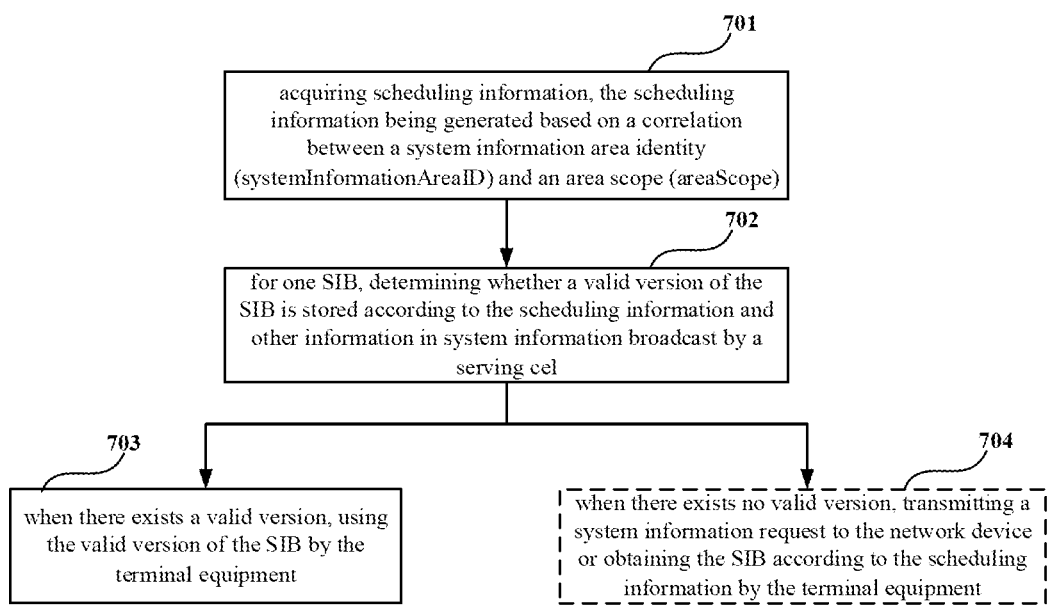
FIG. 7 is a schematic diagram of the method for acquiring system information of Embodiment 2 of this disclosure.

FIG. 7 is a schematic diagram of the method for acquiring system information of Embodiment 2 of this disclosure. As shown in FIG. 7, the method includes:

step 701: acquiring scheduling information, the scheduling information being generated based on a correlation between a system information area identity (systemInformationAreaID) and an area scope (areaScope).

In the embodiment of this disclosure, reference may be made to the disclosure contained in Embodiment 1 for a method for generating the scheduling information, which shall not be repeated herein any further.

In the embodiment of this disclosure, the scheduling information may be included in SIB1, for example, the SIB1 is transmitted by the network device by broadcast.

In the embodiment of this disclosure, as shown in FIG. 7, the method may further include:

step 702: for one SIB, determining whether a valid version of the SIB is stored according to the scheduling information and other information in system information broadcast by a serving cell.

In the embodiment of this disclosure, the other information may be included in SIB1.

In the embodiment of this disclosure, the SIB may be at least one of SIB2, SIB3, SIB4 and SIB5. In addition, the SIB may also be at least one of SIB9, SIB10, SIB11, SIB12, SIB13 and SIB14.

In step 702, for a stored version of the SIB, when the system information area identity and the value tag associated with the SIB in the scheduling information and a public land mobile network identity (PLMN-Identity) in the other information are identical to a system information area identity, a value tag and a public land mobile network identity associated with the stored version, the terminal equipment considers that the stored version is valid.

Or, for a stored version of the SIB, when the value tag associated with the SIB in the scheduling information and a public land mobile network identity (PLMN-Identity) and a cell identity in the other information are identical to a value tag, a public land mobile network identity and a cell identity associated with the stored version, the terminal equipment considers that the stored version is valid.

For example, when the terminal equipment does not have an NPN capability or the serving cell is not an NPN-only cell, when the system information area identity in the scheduling information, the value tag (valueTag) associated with the SIB and the public land mobile network identity (PLMN-Identity) in the other information are identical to the system information area identity, the value tag and the public land mobile network identity associated with the stored version, the terminal equipment considers that the stored version is valid.

Or, for example, when the terminal equipment does not have an NPN capability or the serving cell is not an NPN-only cell, when the value tag (valueTag) associated with the SIB, the public land mobile network identity (PLMN-Identity) and a cell identity in the other information are identical to the value tag, the public land mobile network identity and a cell identity associated with the stored version, the terminal equipment considers that the stored version is valid.

In step 702, it may also be that for a stored version of the SIB, when the system information area identity and the value tag associated with the SIB in the scheduling information and the NPN identity (NPN-Identity) in the other information are identical to the system information area identity, the value tag and the NPN identity associated with the stored version, the terminal equipment considers that the stored version is valid.

Or, for a stored version of the SIB, when the value tag associated with the SIB in the scheduling information and the NPN identity (NPN-Identity) and the cell identity in the other information are identical to the value tag, the NPN identity and the cell identity associated with the stored version, the terminal equipment considers that the stored version is valid.

For example, when the terminal equipment has an NPN capability and the serving cell is an NPN-only cell, when the system information area identity in the scheduling information, the value tag associated with the SIB and the NPN identity (NPN-Identity) in the other information are identical to the system information area identity, the value tag and the NPN identity associated with the stored version, the terminal equipment considers that the stored version is valid.

Or, for example, when the terminal equipment has an NPN capability and the serving cell is an NPN-only cell, when the value tag associated with the SIB, the NPN-Identity and a cell identity in the other information are identical to the value tag, the NPN-Identity and the cell identity associated with the stored version, the terminal equipment considers that the stored version is valid.

In the embodiment of this disclosure, as shown in FIG. 7, the method may further include:

step 703: when there exists a valid version, using the valid version of the SIB by the terminal equipment; and step 704: when there exists no valid version, transmitting a system information request to the network device or obtaining the SIB according to the scheduling information by the terminal equipment.

It can be seen from the above embodiment that the terminal equipment acquires the scheduling information generated by the network device based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 3

The embodiment of this disclosure provides a method for acquiring system information. This method is applicable to a network device and a terminal equipment, and corresponds to the method for configuring system information applicable to a network device described in Embodiment 1 and the method for acquiring system information applicable to a terminal equipment, with identical contents being not going to be repeated any further.

Figure 8:
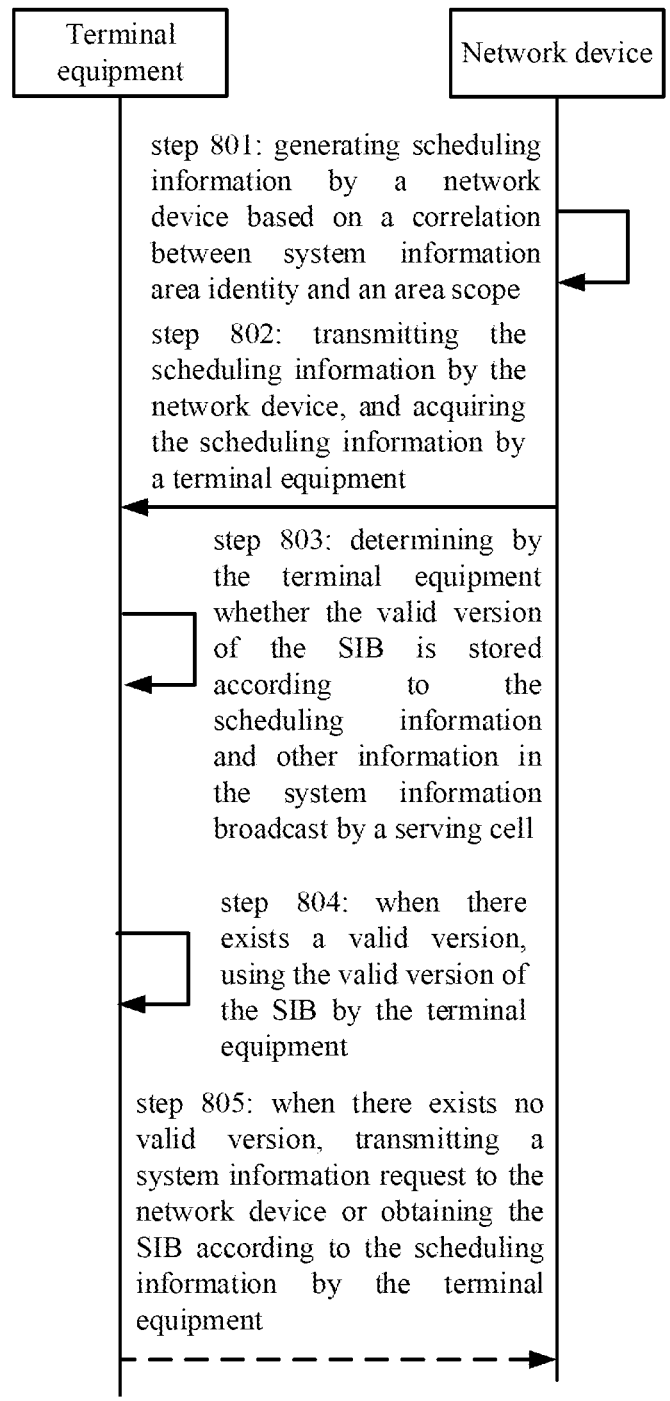
FIG. 8 is a schematic diagram of the method for acquiring system information of Embodiment 3 of this disclosure.

FIG. 8 is a schematic diagram of the method for acquiring system information of Embodiment 3 of this disclosure. As shown in FIG. 8, the method includes:

step 801: generating scheduling information by a network device based on a correlation between system information area identity and an area scope;

step 802: transmitting the scheduling information by the network device, and acquiring the scheduling information by a terminal equipment;

step 803: determining by the terminal equipment whether the valid version of the SIB is stored according to the scheduling information and other information in the system information broadcast by a serving cell;

step 804: when there exists a valid version, using the valid version of the SIB by the terminal equipment; and step 805: when there exists no valid version, transmitting a system information request to the network device or obtaining the SIB according to the scheduling information by the terminal equipment.

In the embodiment of this disclosure, in step 805, transmitting a system information request to the network device by the terminal equipment is optional. For example, when the network device has broadcast the scheduling information including the SIB, the terminal equipment does not need to transmit the system information request, and may directly acquire the SIB according to the scheduling information.

In the embodiment of this disclosure, reference may be made to the disclosure contained in Embodiment 1 and Embodiment 2 for implementations of the steps in FIG. 8, which shall not be repeated herein any further.

It can be seen from the above embodiment that the network device generates the scheduling information based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 4

The embodiment of this disclosure provides a method for acquiring system information, applicable to a terminal equipment, such as the terminal equipment 102 in FIG. 2.

Figure 9:
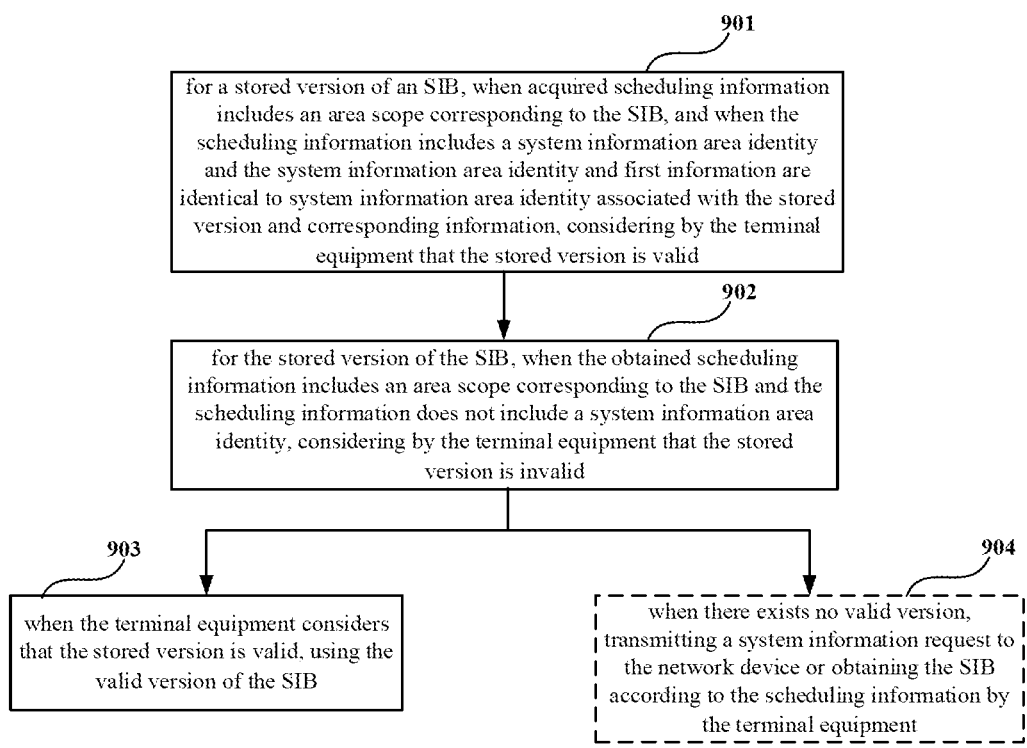
FIG. 9 is a schematic diagram of the method for acquiring system information of Embodiment 4 of this disclosure.

FIG. 9 is a schematic diagram of the method for acquiring system information of Embodiment 4 of this disclosure. As shown in FIG. 9, the method includes:

step 901: for a stored version of an SIB, when acquired scheduling information includes an area scope corresponding to the SIB, and when the scheduling information includes a system information area identity and the system information area identity and first information are identical to system information area identity associated with the stored version and corresponding information, considering by the terminal equipment that the stored version is valid.

In the embodiment of this disclosure, the SIB may be at least one of SIB2, SIB3, SIB4 and SIB5. In addition, the SIB may also be at least one of SIB9, SIB10, SIB11, SIB12, SIB13 and SIB14.

In the embodiment of this disclosure, when the SIB has multiple stored versions, validities of the stored versions are checked one by one.

In the embodiment of this disclosure, the first information may include: a first PLMN identity (PLMN-Identity) included in a PLMN identity information list (PLMN-IdentityInfoList) and received from a serving cell, and a value tag (valueTag) associated with the SIB included in the scheduling information; and the corresponding information includes: a PLMN identity (PLMN-Identity) and a value tag associated with the stored version of the SIB.

For example, when the terminal equipment does not have an NPN capability or a serving cell is not an NPN-only cell, the first information includes: a first PLMN identity (PLMN-Identity) included in a PLMN identity information list (PLMN-IdentityInfoList) and received from a serving cell, and a value tag (valueTag) associated with the SIB included in the scheduling information; and the corresponding information includes: a PLMN identity (PLMN-Identity) and a value tag associated with the stored version of the SIB.

In the embodiment of this disclosure, or, the first information may include: a first NPN identity included in a NPN identity information list (NPN-IdentityInfoList) and received from a serving cell, and a value tag (valueTag) associated with the SIB included in the scheduling information; and the corresponding information includes: a NPN identity and a value tag associated with the stored version of the SIB.

For example, when the terminal equipment has an NPN capability and a serving cell is an NPN-only cell, the first information includes: a first NPN identity included in an NPN identity information list (NPN-IdentityInfoList) and received from a serving cell, and a value tag (valueTag) associated with the SIB included in the scheduling information; and the corresponding information includes: an NPN identity and a value tag associated with the stored version of the SIB.

In the embodiment of this disclosure, as shown in FIG. 9, the method may further include:
  step 902: for the stored version of the SIB, when the obtained scheduling information includes an area scope corresponding to the SIB and the scheduling information does not include a system information area identity, considering by the terminal equipment that the stored version is invalid.

That is, for a stored version of an SIB, when the obtained scheduling information includes an area scope corresponding to the SIB, the scheduling information includes the system information area identity and the system information area identity and the first information are identical to the system information area identity associated with the stored version and corresponding information, the terminal equipment considers that the stored version is valid; otherwise, the terminal equipment considers that the stored version is invalid.

For example, for Rel-15, for each stored version of an SIB,
  when the area scope is associated, and for the stored version of the SIB, a value of the area scope is identical to a value from the serving cell received in the system scheduling information on the SIB,
  when a first PLMN identity included in the PLMN identity information list, a system information area identity (if any) and a value tag of the SIB included in the system scheduling information received from the serving cell are in consistence with a PLMN identity, a system information area identity and a value tag associated with the stored version of the SIB,
  it is considered that the stored SIB is valid for the cell.
For another example, for Rel-15, for each stored version of an SIB,
  when the area scope is associated, and for the stored version of the SIB, a value of the area scope is identical to a value from the serving cell received in the system scheduling information on the SIB, and when the system scheduling information includes a system information area identity,
  when a first PLMN identity included in the PLMN identity information list, a system information area identity and a value tag of the SIB included in the system scheduling information received from the serving cell are in consistence with a PLMN identity, a system information area identity and a value tag associated with the stored version of the SIB,
  it is considered that the stored SIB is valid for the cell.

In this method, when the system information area identity is configured, the terminal equipment in Rel-15 determines validity of a stored version of an SIB by checking a system information area identity, thereby avoiding uncertainty of behaviors of the terminal equipment, reducing the complexity of the test, and reducing the cost of the equipment.

In addition, in this method, when the system information area identity is not configured, the terminal equipment considers that the stored version is invalid, which has little impact on the behaviors and standards of a current terminal equipment, and may lower implementation costs.

For example, for Rel-16, for each stored version of an SIB,
  when the area scope is associated, and for the stored version of the SIB, a value of the area scope is identical to a value from the serving cell received in the system scheduling information on the SIB,
  when the terminal equipment has an NPN capability and the cell is an NPN-only cell, and a first NPN identity, a system information area identity (if any) included in the NPN identity list and a value tag of the SIB included in the system scheduling information received from the serving cell are consistent with an NPN identity, a system information area identity and a value tag associated with the stored version of the SIB,
  it is considered that the stored SIB is valid for the cell;
  otherwise, when a first PLMN identity, the system information area identity (if any) included in the PLMN identity list and the value tag of the SIB included in the system scheduling information received from the serving cell are consistent with a PLMN identity, a system information area identity and a value tag associated with the stored version of the SIB,
  it is considered that the stored SIB is valid for the cell.
For another example, for Rel-16, for each stored version of an SIB,
  when the area scope is associated, and for the stored version of the SIB, a value of the area scope is identical to a value from the serving cell received in the system scheduling information on the SIB, and when the system scheduling information includes a system information area identity,
  when the terminal equipment has an NPN capability, the cell is an NPN-only cell and a first NPN identity included in the NPN identity information list, a system information area identity and a value tag of the SIB included in the system scheduling information received from the serving cell are in consistence with an NPN identity, a system information area identity and a value tag associated with the stored version of the SIB,
  it is considered that the stored SIB is valid for the cell;
  otherwise, when a first PLMN identity, the system information area identity included in the PLMN identity list and the value tag of the SIB included in the system scheduling information received from the serving cell are consistent with a PLMN identity, a system information area identity and a value tag associated with the stored version of the SIB,
  it is considered that the stored SIB is valid for the cell.

In this method, when the system information area identity is configured, the terminal equipment in Rel-16 determines validity of a stored version of an SIB by checking the system information area identity, thereby avoiding uncertainty of behaviors of the terminal equipment, reducing the complexity of the test, and lowering overhead of the equipment. That the terminal equipment in Rel-16 has a capability to support a non-public network (NPN) is taken into account in this method, so that the terminal equipment may check the NPN identity, instead of the PLMN identity, so as to determine validity of a stored version of an SIB, thereby avoiding uncertainty of the behaviors of the terminal equipment when the network device does not broadcast the PLMN identity.

In addition, in this method, the terminal equipment considers that the stored version is invalid when the system information area identity is not configured, which has little impact on the behaviors and standards of the current terminal equipment, and may lower the cost of implementation.

In the embodiment of this disclosure, as shown in FIG. 9, the method may further include:

step 903: when the terminal equipment considers that the stored version is valid, using the valid version of the SIB; and step 904: when there exists no valid version, transmitting a system information request to the network device or obtaining the SIB according to the scheduling information by the terminal equipment.

Figure 10:
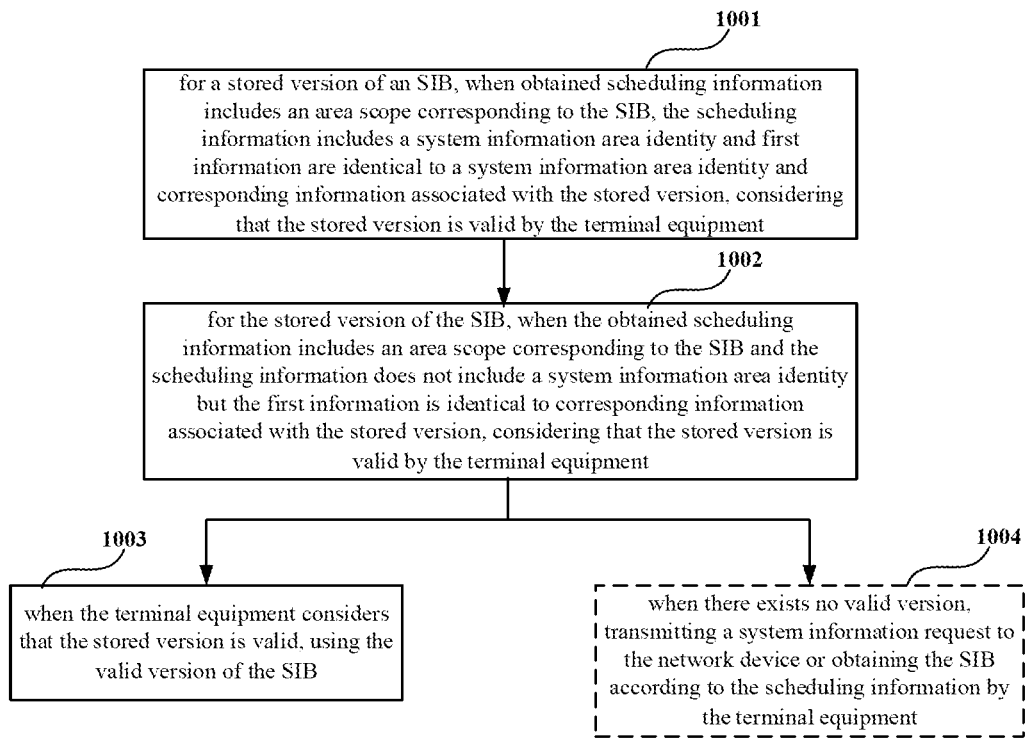
FIG. 10 is another schematic diagram of the method for acquiring system information of Embodiment 4 of this disclosure.

FIG. 10 is another schematic diagram of the method for acquiring system information of Embodiment 4 of this disclosure. As shown in FIG. 10, the method includes:

step 1001: for a stored version of an SIB, when obtained scheduling information includes an area scope corresponding to the SIB, the scheduling information includes a system information area identity and first information are identical to a system information area identity and corresponding information associated with the stored version, considering that the stored version is valid by the terminal equipment; and step 1002: for the stored version of the SIB, when the obtained scheduling information includes an area scope corresponding to the SIB and the scheduling information does not include a system information area identity but the first information is identical to corresponding information associated with the stored version, considering that the stored version is valid by the terminal equipment.

That is, for a stored version of an SIB, when the obtained scheduling information includes an area scope corresponding to the SIB, and when the scheduling information includes an system information area identity and the system information area identity and first information are identical to an system information area identity and corresponding information associated with the stored version, the terminal equipment considers that the stored version is valid; and when the scheduling information does not include the system information area identity and the first information is identical to the corresponding information associated with the stored version, the terminal equipment also considers that the stored version is valid.

For example, for Rel-15, for each stored version of an SIB, when the area scope is associated, and for the stored version of the SIB, a value of the area scope is identical to a value from the serving cell received in the system scheduling information on the SIB, when a first PLMN identity included in the PLMN identity information list, a system information area identity (if any) and a value tag of the SIB included in the system scheduling information received from the serving cell are in consistence with a PLMN identity, a system information area identity and a value tag associated with the stored version of the SIB, it is considered that the stored SIB is valid for the cell;

when the area scope is associated and for the stored version of the SIB, a value of the area scope is identical to a value from the serving cell received in the system scheduling information on the SIB, and when the system information area identity is not included in the system scheduling information, when a first PLMN identity included in the PLMN identity information list and a value tag of the SIB included in the system scheduling information received from the serving cell are in consistence with a PLMN identity and a value tag associated with the stored version of the SIB, it is considered that the stored SIB is valid for the cell;

when the area scope does not exist for the stored version of the SIB and a value of the area scope is not included in the system scheduling information on the SIB from the serving cell, when a first PLMN identity included in the PLMN identity information list, a cell identity and a value tag of the SIB included in the system scheduling information received from the serving cell are in consistence with a PLMN identity, a cell identity and a value tag associated with the stored version of the SIB, it is considered that the stored SIB is valid for the cell.

For another example, for Rel-15, for each stored version of an SIB, when the area scope is associated, and for the stored version of the SIB, a value of the area scope is identical to a value from the serving cell received in the system scheduling information on the SIB, and when the system scheduling information includes a system information area identity, when a first PLMN identity included in the PLMN identity information list, a system information area identity and a value tag of the SIB included in the system scheduling information received from the serving cell are in consistence with a PLMN identity, a system information area identity and a value tag associated with the stored version of the SIB, it is considered that the stored SIB is valid for the cell;

when the area scope is associated and for the stored version of the SIB, a value of the area scope is identical to a value from the serving cell received in the system scheduling information on the SIB, and when the system information area identity is not included in the system scheduling information, when a first PLMN identity included in the PLMN identity information list and a value tag of the SIB included in the system scheduling information received from the serving cell are in consistence with a PLMN identity and a value tag associated with the stored version of the SIB, it is considered that the stored SIB is valid for the cell;

when the area scope does not exist for the stored version of the SIB and a value of the area scope is not included in the system scheduling information on the SIB from the serving cell, when a first PLMN identity included in the PLMN identity information list, a cell identity and a value tag of the SIB included in the system scheduling information received from the serving cell are in consistence with a PLMN identity, a cell identity and a value tag associated with the stored version of the SIB, it is considered that the stored SIB is valid for the cell.

For example, for Rel-16, for each stored version of an SIB, when the area scope is associated, and for the stored version of the SIB, a value of the area scope is identical to a value from the serving cell received in the system scheduling information of the SIB, when the terminal equipment has an NPN capability and the cell is an NPN-only cell, and a first NPN identity, a system information area identity (if any) included in the NPN identity list and a value tag of the SIB included in the system scheduling information received from the serving cell are consistent with an NPN identity, a system information area identity and a value tag associated with the stored version of the SIB, it is considered that the stored SIB is valid for the cell;

otherwise, when a first PLMN identity, the system information area identity (if any) and the value tag of the SIB included in the system scheduling information received from the serving cell are consistent with a PLMN identity, a system information area identity and a value tag associated with the stored version of the SIB, it is considered that the stored SIB is valid for the cell;

when the area scope is associated, and for the stored version of the SIB, a value of the area scope is identical to a value from the serving cell received in the system scheduling information of the SIB, and when the system scheduling information does not include a system information area identity, when the terminal equipment has an NPN capability and the cell is an NPN-only cell, and a first NPN identity and a value tag of the SIB included in the system scheduling information received from the serving cell are consistent with an NPN identity and a value tag associated with the stored version of the SIB, it is considered that the stored SIB is valid for the cell;

when the area scope does not exist for the stored version of the SIB and a value of the area scope is not included in the system scheduling information on the SIB from the serving cell, when the terminal equipment has an NPN capability and the cell is an NPN-only cell, and a first NPN identity, a cell identity and a value tag of the SIB included in the system scheduling information received from the serving cell are consistent with an NPN identity, a cell identity and a value tag associated with the stored version of the SIB, it is considered that the stored SIB is valid for the cell.

For another example, for Rel-16, for each stored version of an SIB, when the area scope is associated, and for the stored version of the SIB, a value of the area scope is identical to a value from the serving cell received in the system scheduling information on the SIB, and when the system scheduling information includes a system information area identity, when the terminal equipment has an NPN capability, the cell is an NPN-only cell and a first NPN identity included in the NPN identity information list, a system information area identity and a value tag of the SIB included in the system scheduling information received from the serving cell are in consistence with an NPN identity, a system information area identity and a value tag associated with the stored version of the SIB, it is considered that the stored SIB is valid for the cell;

otherwise, when a first PLMN identity, the system information area identity included in the PLMN identity list and the value tag of the SIB included in the system scheduling information received from the serving cell are consistent with a PLMN identity, a system information area identity and a value tag associated with the stored version of the SIB, it is considered that the stored SIB is valid for the cell;

when the area scope is associated, and for the stored version of the SIB, a value of the area scope is identical to a value from the serving cell received in the system scheduling information on the SIB, and when the system scheduling information does not include a system information area identity, when the terminal equipment has an NPN capability, the cell is an NPN-only cell and a first NPN identity included in the NPN identity information list and a value tag of the SIB included in the system scheduling information received from the serving cell are in consistence with an NPN identity and a value tag associated with the stored version of the SIB, it is considered that the stored SIB is valid for the cell;

when the area scope does not exist for the stored version of the SIB and a value of the area scope is not included in the system scheduling information on the SIB from the serving cell, when the terminal equipment has an NPN capability and the cell is an NPN-only cell, and a first NPN identity, a cell identity and a value tag of the SIB included in the system scheduling information received from the serving cell are consistent with an NPN identity, a cell identity and a value tag associated with the stored version of the SIB, it is considered that the stored SIB is valid for the cell.

In the embodiment of this disclosure, as shown in FIG. 10, the method may further include:

step 1003: when the terminal equipment considers that the stored version is valid, using the valid version of the SIB; and step 1004: when there exists no valid version, transmitting a system information request to the network device or obtaining the SIB according to the scheduling information by the terminal equipment.

Figure 11:
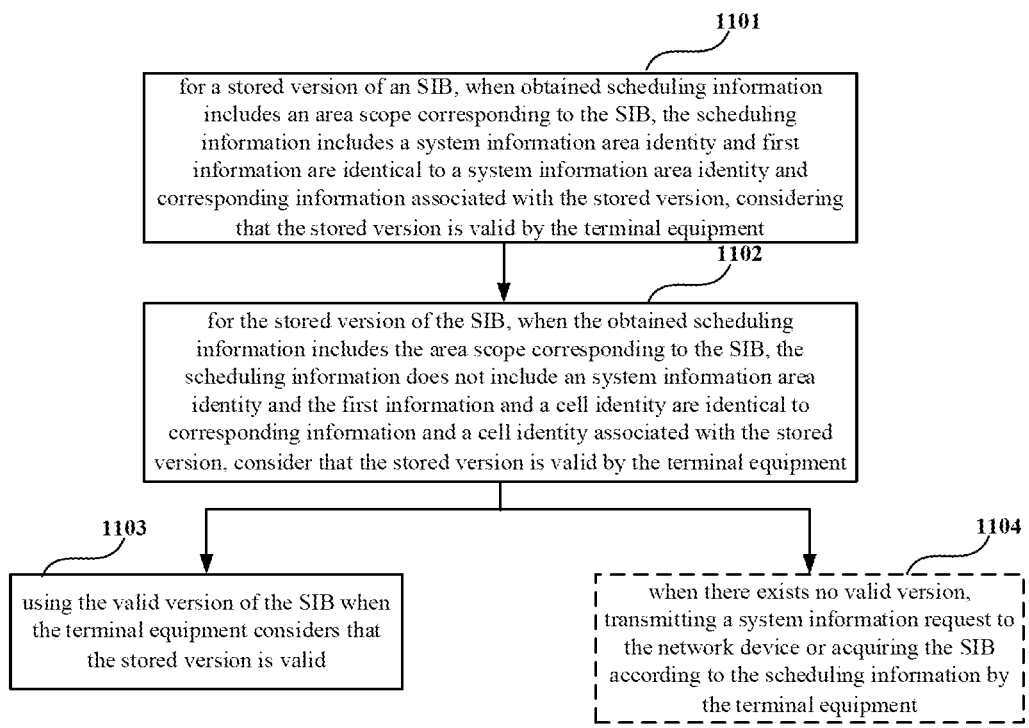
FIG. 11 is a further schematic diagram of the method for acquiring system information of Embodiment 4 of this disclosure.

FIG. 11 is a further schematic diagram of the method for acquiring system information of Embodiment 4 of this disclosure. As shown in FIG. 11, the method includes:

step 1101: for a stored version of an SIB, when obtained scheduling information includes an area scope corresponding to the SIB, the scheduling information includes a system information area identity and first information are identical to a system information area identity and corresponding information associated with the stored version, considering that the stored version is valid by the terminal equipment; and step 1102: for the stored version of the SIB, when the obtained scheduling information includes the area scope corresponding to the SIB, the scheduling information does not include an system information area identity and the first information and a cell identity are identical to corresponding information and a cell identity associated with the stored version, consider that the stored version is valid by the terminal equipment.

That is, for a stored version of an SIB, when the obtained scheduling information includes the area scope corresponding to the SIB, and when the scheduling information includes the system information area identity and the system information area identity and the first information are identical to the system information area identity and the corresponding information associated with the stored version, the terminal equipment considers that the stored version is valid; and when the scheduling information does not include the system information area identity and the first information and the cell identity are identical to the corresponding information and cell identity associated with the stored version, the terminal equipment also considers that the stored version is valid.

For example, for Rel-15, for each stored version of an SIB, when the area scope is associated, and for the stored version of the SIB, a value of the area scope is identical to a value from the serving cell received in the system scheduling information on the SIB,
when a first PLMN identity included in the PLMN identity information list, a system information area identity (if any) and a value tag of the SIB included in the system scheduling information received from the serving cell are in consistence with a PLMN identity, a system information area identity and a value tag associated with the stored version of the SIB,
it is considered that the stored SIB is valid for the cell;
when the area scope is associated and for the stored version of the SIB, a value of the area scope is identical to a value from the serving cell received in the system scheduling information on the SIB, and when the system information area identity is not included in the system scheduling information, or
when the area scope does not exist for the stored version of the SIB and a value of the area scope is not included in the system scheduling information on the SIB from the serving cell,
when a first PLMN identity included in the PLMN identity information list, a cell identity and a value tag of the SIB included in the system scheduling information received from the serving cell are in consistence with a PLMN identity, a cell identity and a value tag associated with the stored version of the SIB,
it is considered that the stored SIB is valid for the cell.

For another example, for Rel-15, for each stored version of an SIB, when the area scope is associated, and for the stored version of the SIB, a value of the area scope is identical to a value from the serving cell received in the system scheduling information on the SIB, and when the system scheduling information includes a system information area identity,
when a first PLMN identity included in the PLMN identity information list, a system information area identity and a value tag of the SIB included in the system scheduling information received from the serving cell are in consistence with a PLMN identity, a system information area identity and a value tag associated with the stored version of the SIB,
it is considered that the stored SIB is valid for the cell;
when the area scope is associated and for the stored version of the SIB, a value of the area scope is identical to a value from the serving cell received in the system scheduling information on the SIB, and when the system information area identity is not included in the system scheduling information, or
when the area scope does not exist for the stored version of the SIB and a value of the area scope is not included in the system scheduling information on the SIB from the serving cell,
when a first PLMN identity included in the PLMN identity information list, a cell identity and a value tag of the SIB included in the system scheduling information received from the serving cell are in consistence with a PLMN identity, a cell identity and a value tag associated with the stored version of the SIB,
it is considered that the stored SIB is valid for the cell.

In this method, when the system information area identity is configured, the terminal equipment in Rel-15 determines validity of a stored version of an SIB by checking a system information area identity, thereby avoiding uncertainty of behaviors of the terminal equipment, reducing the complexity of the test, and reducing the cost of the equipment.

In addition, in this method, when the system information area identity is not configured, the terminal equipment needs to check the cell identity to determine validity of the stored version. Hence, when cell identities are consistent, i.e. the SIB is unchanged, the terminal equipment does not need to acquire the SIB again, thereby reducing power consumption of the terminal.

For example, for Rel-16, for each stored version of an SIB, when the area scope is associated, and for the stored version of the SIB, a value of the area scope is identical to a value from the serving cell received in the system scheduling information on the SIB,
when the terminal equipment has an NPN capability and the cell is an NPN-only cell, and a first NPN identity, a system information area identity (if any) included in the NPN identity list and a value tag of the SIB included in the system scheduling information received from the serving cell are consistent with an NPN identity, a system information area identity and a value tag associated with the stored version of the SIB,
it is considered that the stored SIB is valid for the cell;
otherwise, when a first PLMN identity, the system information area identity (if any) and the value tag of the SIB included in the system scheduling information received from the serving cell are consistent with a PLMN identity, a system information area identity and a value tag associated with the stored version of the SIB,
it is considered that the stored SIB is valid for the cell;
when the area scope is associated and for the stored version of the SIB, a value of the area scope is identical to a value from the serving cell received in the system scheduling information on the SIB, and when the system information area identity is not included in the system scheduling information, or
when the area scope does not exist for the stored version of the SIB and a value of the area scope is not included in the system scheduling information on the SIB from the serving cell,
when the terminal equipment has an NPN capability and the cell is an NPN-only cell, and a first NPN identity, a system information area identity included in the NPN identity list, a cell identity and a value tag of the SIB included in the system scheduling information received from the serving cell are consistent with an NPN identity, a cell identity and a value tag associated with the stored version of the SIB,
it is considered that the stored SIB is valid for the cell.

For another example, for Rel-16, for each stored version of an SIB, when the area scope is associated, and for the stored version of the SIB, a value of the area scope is identical to a value from the serving cell received in the system scheduling information on the SIB, and when the system scheduling information includes a system information area identity,
when the terminal equipment has an NPN capability, the cell is an NPN-only cell and a first NPN identity included in the NPN identity information list, a system information area identity and a value tag of the SIB included in the system scheduling information received from the serving cell are in consistence with an NPN identity, a system information area identity and a value tag associated with the stored version of the SIB, it is considered that the stored SIB is valid for the cell;

otherwise, when a first PLMN identity, the system information area identity included in the PLMN identity list and the value tag of the SIB included in the system scheduling information received from the serving cell are consistent with a PLMN identity, a system information area identity and a value tag associated with the stored version of the SIB, it is considered that the stored SIB is valid for the cell;

when the area scope is associated and for the stored version of the SIB, a value of the area scope is identical to a value from the serving cell received in the system scheduling information on the SIB, and when the system information area identity is not included in the system scheduling information, or when the area scope does not exist for the stored version of the SIB and a value of the area scope is not included in the system scheduling information on the SIB from the serving cell, when the terminal equipment has an NPN capability and the cell is an NPN-only cell, and a first NPN identity, a cell identity and a value tag of the SIB included in the system scheduling information received from the serving cell are consistent with an NPN identity, a cell identity and a value tag associated with the stored version of the SIB, it is considered that the stored SIB is valid for the cell.

In this method, when the system information area identity is configured, the terminal equipment in Rel-16 determines the validity of the stored version of an SIB by checking the system information area identity, avoiding the uncertainty of the behavior of the terminal equipment, reducing the complexity of the test, and reducing the cost of the device. That the terminal equipment in Rel-16 has a capability to support a non-public network (NPN) is taken into account in this method, so that the terminal equipment may check the NPN identity, instead of the PLMN identity, so as to determine validity of a stored version of an SIB, thereby avoiding uncertainty of the behaviors of the terminal equipment when the network device does not broadcast the PLMN identity.

In addition, in this method, when the system information area identity is not configured, the terminal equipment needs to check the cell identity to determine validity of the stored version. Hence, when cell identities are consistent, i.e. the SIB is unchanged, the terminal equipment does not need to acquire the SIB again, thereby reducing power consumption of the terminal.

In the embodiment of this disclosure, as shown in FIG. 11, the method may further include:

step 1103: using the valid version of the SIB when the terminal equipment considers that the stored version is valid; and step 1104: when there exists no valid version, transmitting a system information request to the network device or acquiring the SIB according to the scheduling information by the terminal equipment.

It can be seen from the above embodiments that when the terminal equipment checks validity of a stored version of an SIB, behaviors of the terminal equipment in case of configuring or not configuring a system information area identity are specified. Hence, uncertainty of the behaviors of the terminal equipment may be avoided, and complexity of test and overhead of the terminal equipment may be lowered.

Embodiment 5

The embodiment of this disclosure provides a method for configuring system information, applicable to a network device, such as the network device 101 shown in FIG. 2.

FIG. 12 is a schematic diagram of the method for configuring system information of Embodiment 5 of this disclosure. As shown in FIG. 12, the method includes:

step 1201: for a terminal equipment-specific parameter, when a presence condition includes that a serving cell is configured with a supplementary uplink, taking a capability of the terminal equipment into account by the network device, or, for a terminal equipment-specific parameter and a cell-specific parameter, when the presence condition includes that a serving cell is configured with a supplementary uplink, not taking a capability of the terminal equipment into account or taking only that a network device provides SUL (Supplementary Uplink) configuration for the terminal equipment into account by the network device.

In the embodiment of this disclosure, for example, that the network device takes a capability of the terminal equipment into account includes:

determining by the network device based on the capability of the terminal equipment that the terminal equipment is able to support an SUL frequency band provided in the SUL configuration; or, providing the terminal equipment with the SUL configuration by the network device, and determining by the network device based on the capability of the terminal equipment that the terminal equipment is able to support an SUL frequency band provided in the SUL configuration.

In the embodiment of this disclosure, for example, that the network device takes a capability of the terminal equipment into account includes:

indicating by presence of a supplementary uplink (supplementaryUplink) in a common cell configuration (servingCellConfigCommon) that the network device provides the SUL configuration for the terminal equipment.

In the embodiment of this disclosure, for example, the terminal equipment-specific parameter is tpc-Index and/or tpc-IndexSUL.

In the embodiment of this disclosure, for example, the terminal equipment-specific parameter is information or an IE or a field.

For example, the terminal equipment-specific parameter may also be terminal equipment-specific information or a terminal equipment-specific IE or a terminal equipment-specific field.

In step 1201, for example, that when the presence condition includes that a serving cell is configured with a supplementary uplink, not taking a capability of the terminal equipment into account or taking only that the network device provides SUL configuration for the terminal equipment into account, includes: in scheduling information, optionally providing configuration on the supplementary uplink for transmission of a system information message (si-RequestConfigSUL) when cell-common first configuration information includes the supplementary uplink configuration.

That is, when the cell-common first configuration information includes the supplementary uplink configuration, the supplementary uplink configuration for system information message transmission is optionally provided in the scheduling information.

In the embodiment of this disclosure, the first configuration information is serving cell-common configuration (servingCellConfigCommon).

In step 1201, for example, when a supplementary uplink (supplementaryUplink) is present in the serving cell-common configuration (servingCellConfigCommon) and when a system information broadcast status (such as si-BroadcastStatus, posSI-BroadcastStatus) of any system information message (SI-message) in the scheduling information (SchedulingInfo) is set to be not broadcast, in the scheduling information, the configuration on the supplementary uplink for transmission of the system information message (such as si-RequestConfigSUL, posSI-RequestConfigSUL-r16) is optionally provided.

That is, when a supplementary uplink is present in the cell-common configuration (servingCellConfigCommon) and when a system information broadcast status (such as si-BroadcastStatus, posSI-BroadcastStatus) of any system information message (SI-message) in the scheduling information (SchedulingInfo) is set to be "not broadcasting (notBroadcasting)", the configuration (such as si-RequestConfigSUL, posSI-RequestConfigSUL-R16) for transmission of the system information message on the supplementary uplink may be optionally present; otherwise, si-RequestConfigSUL or posSI-RequestConfigSUL-r16 is vacant.

In the embodiment of this disclosure, a presence condition of the configuration on the supplementary uplink for transmission of the system information message is that: when a supplementary uplink (supplementaryUplink) is present in the serving cell-common configuration (servingCellConfigCommon) and when a system information broadcast status (such as si-BroadcastStatus, posSI-BroadcastStatus) of any system information message (SI-message) in the scheduling information (SchedulingInfo) is set to be not broadcast, the configuration on the supplementary uplink for transmission of the system information message is present optionally, otherwise, the configuration on the supplementary uplink for transmission of the system information message is vacant.

For example, a presence condition SUL-MSG-1 of si-RequestConfigSUL may be defined in Table 5 below.

TABLE 5

| Conditional presence | Explanation |
| --- | --- |
| SUL-MSG-1 | The field is optionally present, Need R, if supplementaryUplink is present in servingCellConfigCommonif this serving cell is configured with a supplementary uplink and if si-BroadcastStatus is set to notBroadcasting for any SI-message included in SchedulingInfo. It is absent otherwise. |

In the embodiment of this disclosure, the condition SUL-MSG-1 is only an exemplary name, which may also be expressed by other names, such as a condition SUL-MSG1 or a condition SUL-SI-Request, etc.

For another example, a presence condition SUL-MSG-1 of posSI-RequestConfigSUL-r16 may be defined in Table 6 below.

TABLE 6

| Conditional presence | Explanation |
| --- | --- |
| SUL-MSG-1 | The field is optionally present, Need R, if supplementaryUplink is present in servingCellConfigCommon and if posSI-BroadcastStatus is set to notBroadcasting for any SI-message included in PosSchedulingInfo. It is absent otherwise. |

For another example, a presence condition SUL of tpc-Index may be defined in Table 7 below.

TABLE 7

| Conditional presence | Explanation |
| --- | --- |
| SUL | The field is optionally present, Need R, if supplementaryUplink is present in servingCellConfigCommon. It is mandatory present otherwise. |

For a further example, a presence condition SUL of tpc-Index may be defined in Table 8 below.

TABLE 8

| Conditional presence | Explanation |
| --- | --- |
| SUL | The field is optionally present, Need R, if supplementaryUplink is present in servingCellConfigCommon. It is absent otherwise. |

In the embodiment of this disclosure, the names used for the above conditions are exemplary only, which may also be expressed by other names, and forms and formats of these names are not limited in the embodiments of this disclosure. In the embodiments of this disclosure, the scheduling information is also referred to as system scheduling information, which may be included in SIB1.

It can be seen from the above embodiments that for a terminal equipment-specific parameter, when a presence condition includes that the serving cell configures supplementary uplink, capabilities of the terminal equipment are taken into account, or for a terminal equipment-specific parameter and a cell-specific parameter, when a presence condition includes that the serving cell configures supplementary uplink, capabilities of the terminal equipment are not taken into account, or that the network device provides SUL configuration for the terminal equipment is only taken into account. In this way, the network device is able to specify contents in SIB1, uncertainty of implementations of the network device may be avoided, and testing costs of network device products may be lowered, thereby saving networking costs.

Embodiment 6

The embodiment of this disclosure provides an apparatus for configuring system information, applicable to a network device. As a principle of the apparatus for solving problems is similar to the method of Embodiment 1, reference may be made to the implementation of the method of Embodiment 1 for specific implementations of the apparatus, with identical contents being not going to be repeated herein any further.

FIG. 13 is a schematic diagram of the apparatus for configuring system information of Embodiment 6 of this disclosure. As shown in FIG. 13, an apparatus 1300 includes:

a generating unit 1301 configured to generate scheduling information (SchedulingInfo) based on a correlation between a system information area identity (systemInformationAreaID) and an area scope (areaScope); and a transmitting unit 1302 configured to transmit the scheduling information.

In the embodiment of this disclosure, when the scheduling information includes the system information area identity, the generating unit 1301 mandatorily or optionally configures the area scope for one or more SIBs in the scheduling information; and when the scheduling information does not include the system information area identity, the generating unit 1301 does not configure the area scope in the scheduling information.

In the embodiment of this disclosure, a necessary coding condition of the system information area identity field in the scheduling information is that: when the scheduling information includes the system information area identity, the area scope field is mandatorily present; and when the scheduling information does not include the system information area identity, the area scope field is absent; or, when the scheduling information includes the system information area identity, the area scope field is optionally present; and when the scheduling information does not include the system information area identity, the area scope field is absent.

In the embodiment of this disclosure, it may also be that when the scheduling information includes one or more area scopes configured for one SIB, the generating unit 1301 configures the system information area identity in the scheduling information; and when the scheduling information does not include one or more area scopes configured for one SIB, the generating unit 1301 optionally configures the system information area identity in the scheduling information, or does not configure the system information area identity in the scheduling information.

In the embodiment of this disclosure, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is optionally present.

Or, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is absent.

In the embodiment of this disclosure, the scheduling information may include the system information area identity and the area scope.

In the embodiment of this disclosure, the scheduling information may be transmitted by broadcast.

In the embodiment of this disclosure, the scheduling information may be included in SIB1.

In the embodiment of this disclosure, reference may be made to the contents of the steps in Embodiment 1 for implementations of functions the above units, which shall not be described herein any further.

It can be seen from the above embodiment that the network device generates the scheduling information based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 7

The embodiment of this disclosure provides an apparatus for acquiring system information, applicable to a terminal equipment. As a principle of the apparatus for solving problems is similar to the method of Embodiment 2, reference may be made to the implementation of the method of Embodiment 2 for specific implementations of the apparatus, with identical contents being not going to be repeated herein any further.

Figure 14:
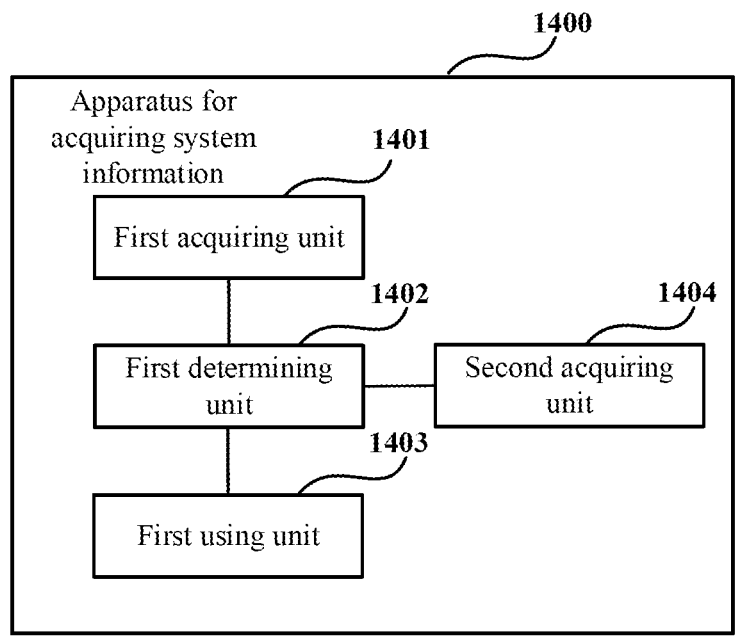
FIG. 14 is a schematic diagram of the apparatus for acquiring system information of Embodiment 7 of this disclosure.

FIG. 14 is a schematic diagram of the apparatus for acquiring system information of Embodiment 7 of this disclosure. As shown in FIG. 14, an apparatus 1400 includes: a first acquiring unit 1401 configured to acquire scheduling information, the scheduling information being generated based on a correlation between a system information area identity (systemInformationAreaID) and an area scope (areaScope).

In the embodiment of this disclosure, as shown in FIG. 14, the apparatus 1400 further includes:

a first determining unit 1402 configured to, for one SIB, determine whether a valid version of the SIB is stored according to the scheduling information and other information in system information broadcast by a serving cell.

Figure 15:
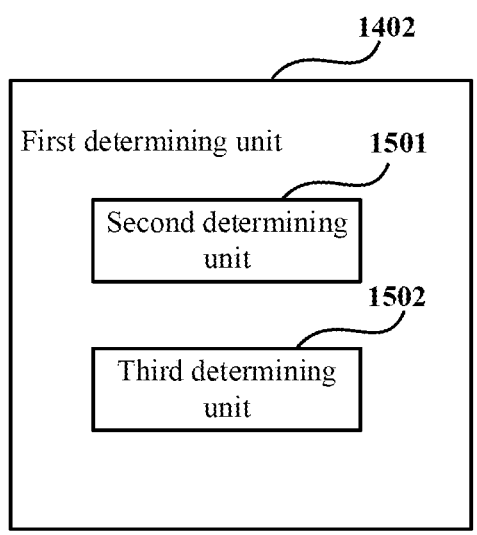
FIG. 15 is a schematic diagram of the first determining unit of Embodiment 7 of this disclosure.

FIG. 15 is a schematic diagram of the first determining unit of Embodiment 7 of this disclosure. As shown in FIG. 15, the first determining unit 1402 includes;

a second determining unit 1501 configured to, for a stored version of the SIB, when the system information area identity, a value tag (valueTag) associated with the SIB in the scheduling information and a public land mobile network identity (PLMN-Identity) in the other information are identical to a system information area identity, a value tag and a public land mobile network identity associated with the stored version, consider that the stored version is valid, or, for a stored version of the SIB, when a value tag (valueTag) associated with the SIB in the scheduling information, a public land mobile network identity (PLMN-Identity) and a cell identity (cellIdentity) in the other information are identical to a value tag, a public land mobile network identity and a cell identity associated with the stored version, consider that the stored version is valid; or a third determining unit 1502 configured to, for a stored version of the SIB, when the system information area identity, a value tag associated with the SIB in the scheduling information and an NPN identity (NPN-Identity) in the other information are identical to a system information area identity, a value tag and an NPN identity associated with the stored version, consider that the stored version is valid, or, for a stored version of the SIB, when a value tag associated with the SIB in the scheduling information, an NPN identity (NPN-Identity) and a cell identity in the other information are identical to a value tag, an NPN identity and a cell identity associated with the stored version, consider that the stored version is valid.

In the embodiment of this disclosure, as shown in FIG. 14, the apparatus 1400 further includes:

a first using unit 1403 configured to, when a valid version exists, use the valid version of the SIB; and a second acquiring unit 1404 configured to, when there exists no valid version, transmit a system information request to a network device or acquire the SIB according to the scheduling information.

In the embodiment of this disclosure, the scheduling information may include the system information area identity and the area scope.

In the embodiment of this disclosure, the SIB may be at least one of SIB2, SIB3, SIB4 and SIB5, and furthermore, the SIB may be at least one of SIB9, SIB10, SIB11, SIB12, SIB13 and SIB14.

In the embodiment of this disclosure, the scheduling information may be included in SIB1.

In the embodiment of this disclosure, reference may be made to the contents of the steps in Embodiment 2 for implementations of functions the above units, which shall not be described herein any further.

It can be seen from the above embodiment that the terminal equipment acquires the scheduling information generated by the network device based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 8

The embodiment of this disclosure provides an apparatus for acquiring system information, applicable to a terminal equipment. As a principle of the apparatus for solving problems is similar to the method of Embodiment 4, reference may be made to the implementation of the method of Embodiment 4 for specific implementations of the apparatus, with identical contents being not going to be repeated herein any further.

Figure 16:
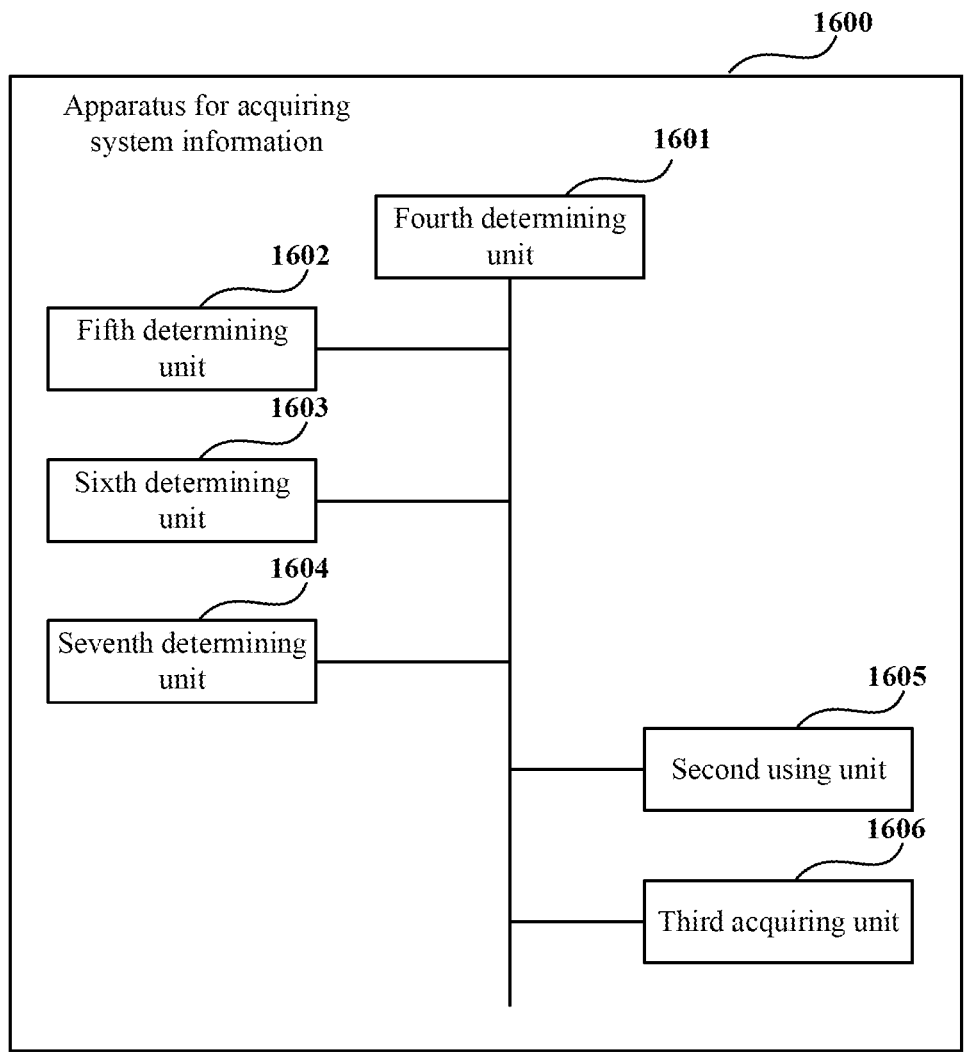
FIG. 16 is a schematic diagram of the apparatus for acquiring system information of Embodiment 8 of this disclosure.

FIG. 16 is a schematic diagram of the apparatus for acquiring system information of Embodiment 8 of this disclosure. As shown in FIG. 16, an apparatus 1600 includes:

a fourth determining unit 1601 configured to, for a stored version of an SIB, when obtained scheduling information includes an area scope (areaScope) corresponding to the SIB, the scheduling information includes a system information area identity (systemInformation-AreaID) and first information are identical to a system information area identity and corresponding information associated with the stored version, consider that the stored version is valid.

In the embodiment of this disclosure, as shown in FIG. 16, the apparatus 1600 may further include:

a fifth determining unit 1602 configured to, for the stored version of the SIB, when the obtained scheduling information includes an area scope corresponding to the SIB and the scheduling information does not include a system information area identity, consider that the stored version is invalid.

In the embodiment of this disclosure, as shown in FIG. 16, the apparatus 1600 may further include:

a sixth determining unit 1603 configured to, for the stored version of the SIB, when the obtained scheduling information includes the area scope corresponding to the SIB, the scheduling information does not include an system information area identity and the first information is identical to corresponding information associated with the stored version, consider that the stored version is valid.

In the embodiment of this disclosure, as shown in FIG. 16, the apparatus 1600 may further include:

a seventh determining unit 1604 configured to, for the stored version of the SIB, when obtained scheduling information includes an area scope (areaScope) corresponding to the SIB, the scheduling information does not include an system information area identity and first information and a cell identity (cellIdentity) are identical to corresponding information and a cell identity associated with the stored version, consider that the stored version is valid.

In the embodiment of this disclosure, the first information may include: a first PLMN identity (PLMN-Identity) included in a PLMN identity information list (PLMN-IdentityInfoList) and received from a serving cell, and a value tag (valueTag) associated with the SIB included in the scheduling information;

and the corresponding information may include: a PLMN identity (PLMN-Identity) and a value tag associated with the stored version of the SIB.

For example, when the terminal equipment does not have an NPN capability or a serving cell is not an NPN-only cell, the first information includes: a first PLMN identity (PLMN-Identity) included in a PLMN identity information list (PLMN-IdentityInfoList) and received from a serving cell, and a value tag (valueTag) associated with the SIB included in the scheduling information; and the corresponding information includes: a PLMN identity (PLMN-Identity) and a value tag associated with the stored version of the SIB.

In the embodiment of this disclosure, or the first information may include: a first PLMN identity included in a PLMN identity information list (PLMN-IdentityInfoList) and received from a serving cell, and a value tag (valueTag) associated with the SIB included in the scheduling information; and the corresponding information includes: a PLMN identity and a value tag associated with the stored version of the SIB.

For example, when the terminal equipment has an NPN capability and a serving cell is an NPN-only cell, the first information includes: a first NPN identity included in an NPN identity information list (NPN-IdentityInfoList) and received from a serving cell, and a value tag (valueTag) associated with the SIB included in the scheduling information; and the corresponding information includes: an NPN identity and a value tag associated with the stored version of the SIB.

In the embodiment of this disclosure, as shown in FIG. 16, the apparatus 1600 may further include:

a second using unit 1605 configured to use a valid version of the SIB when the terminal equipment considers that the stored version is valid; and a third acquiring unit 1606 configured to, when there exists no valid version, the terminal equipment transmits a system information request to the network device or acquire the SIB according to the scheduling information.

In the embodiment of this disclosure, reference may be made to the contents of the steps in Embodiment 4 for implementations of functions the above units, which shall not be described herein any further.

It can be seen from the above embodiment that the terminal equipment acquires the scheduling information generated by the network device based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 9

The embodiment of this disclosure provides an apparatus for configuring system information, applicable to a network device. As a principle of the apparatus for solving problems is similar to the method of Embodiment 5, reference may be made to the implementation of the method of Embodiment 5 for specific implementations of the apparatus, with identical contents being not going to be repeated herein any further.

Figure 17:
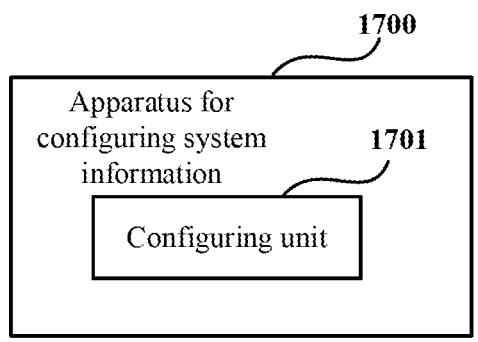
FIG. 17 is a schematic diagram of the apparatus for configuring system information of Embodiment 9 of this disclosure.

FIG. 17 is a schematic diagram of the apparatus for configuring system information of Embodiment 9 of this disclosure. As shown in FIG. 17, an apparatus 1700 includes:

a configuring unit 1701 configured to, for a terminal equipment-specific parameter, when a presence condition comprises that a serving cell is configured with a supplementary uplink, take a capability of the terminal equipment into account, or, for a terminal equipment-specific parameter and a cell-specific parameter, when the presence condition comprises that a serving cell is configured with a supplementary uplink, not to take a capability of the terminal equipment into account or take only that a network device provides SUL (Supplementary Uplink) configuration for the terminal equipment into account.

In the embodiment of this disclosure, that the network device takes a capability of the terminal equipment into account includes:

determining by the network device based on the capability of the terminal equipment that the terminal equipment is able to support an SUL frequency band provided in the SUL configuration; or, providing the terminal equipment with the SUL configuration by the network device, and determining by the network device based on the capability of the terminal equipment that the terminal equipment is able to support an SUL frequency band provided in the SUL configuration.

In the embodiment of this disclosure, that the network device takes a capability of the terminal equipment into account includes:

indicating by presence of a supplementary uplink (supplementaryUplink) in a common cell configuration (servingCellConfigCommon) that the network device provides the SUL configuration for the terminal equipment.

In the embodiment of this disclosure, the terminal equipment-specific parameter is tpc-Index and/or tpc-IndexSUL.

In the embodiment of this disclosure, the terminal equipment-specific parameter is information or an IE or a field.

For example, the terminal equipment-specific parameter may also be terminal equipment-specific information or a terminal equipment-specific IE or a terminal equipment-specific field.

In the embodiment of this disclosure, for example, that when the presence condition includes that a serving cell is configured with a supplementary uplink, not take a capability of the terminal equipment into account or take only that the network device provides SUL configuration for the terminal equipment into account, includes: in scheduling information, optionally providing configuration on the supplementary uplink for transmission of a system information message (such as si-RequestConfigSUL, posSI-RequestConfigSUL-r16) when cell-common first configuration information includes the supplementary uplink configuration.

In the embodiment of this disclosure, the first configuration information may be serving cell-common configuration (servingCellConfigCommon).

In the embodiment of this disclosure, when a supplementary uplink (supplementaryUplink) is present in the serving cell-common configuration (servingCellConfigCommon) and when a system information broadcast status (such as si-BroadcastStatus, posSI-BroadcastStatus) of any system information message (SI-message) in the scheduling information (SchedulingInfo) is set to be not broadcast, in the scheduling information, the configuring unit 1701 optionally provides the configuration on the supplementary uplink for transmission of the system information message (e.g. si-RequestConfigSUL, posSI-RequestConfigSUL-r16).

In the embodiment of this disclosure, a presence condition of the configuration on the supplementary uplink for transmission of the system information message is that:

when a supplementary uplink (supplementaryUplink) is present in the serving cell-common configuration (servingCellConfigCommon) and when a system information broadcast status (such as si-BroadcastStatus, posSI-BroadcastStatus) of any system information message (SI-message) in the scheduling information (SchedulingInfo) is set to be not broadcast, the configuration on the supplementary uplink for transmission of the system information message is present optionally, otherwise, the configuration on the supplementary uplink for transmission of the system information message is vacant.

In the embodiment of this disclosure, the scheduling information may be included in SIB1.

In the embodiment of this disclosure, reference may be made to the contents of the steps in Embodiment 5 for implementations of functions the above units, which shall not be described herein any further.

It can be seen from the above embodiment that for a terminal equipment-specific parameter, when a presence condition includes that the serving cell configures supplementary uplink, capabilities of the terminal equipment are taken into account, or for a terminal equipment-specific parameter and a cell-specific parameter, when a presence condition includes that the serving cell configures supplementary uplink, capabilities of the terminal equipment are not taken into account, or that the network device provides SUL configuration for the terminal equipment is only taken into account. In this way, the network device is able to specify contents in SIB1, uncertainty of implementations of the network device may be avoided, and testing costs of network device products may be lowered, thereby saving networking costs.

Embodiment 10

The embodiment of this disclosure provides a network device, including the apparatus for configuring system information as described in Embodiment 6.

Figure 18:
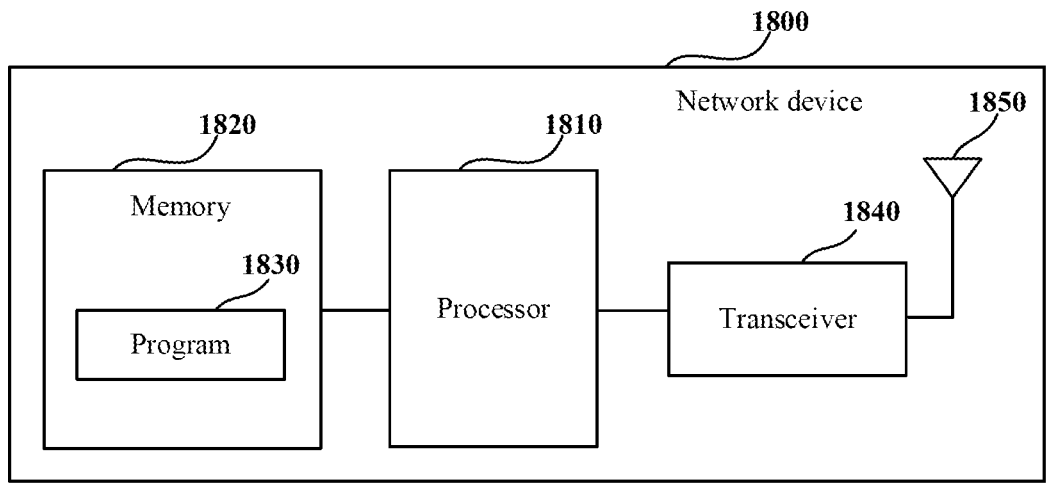
FIG. 18 is a block diagram of a systematic structure of the network device of Embodiment 10 of this disclosure.

FIG. 18 is a block diagram of a systematic structure of the network device of Embodiment 10 of this disclosure. As shown in FIG. 18, a network device 1800 may include a processor 1810 and a memory 1820, the memory 1820 being coupled to the processor 1810. Wherein, the memory 1820 may store various data, and furthermore, it may store a program 1830 for information processing, and execute the program 1830 under control of the processor 1810, so as to receive various information transmitted by a terminal equipment, and transmit various information to the terminal equipment.

In one implementation, the functions of the apparatus for configuring system information may be integrated into the processor 1810. Wherein, processor 1810 may be configured to: generate scheduling information (SchedulingInfo) based on a correlation between a system information area identity (systemInformationAreaID) and an area scope (areaScope); and transmit the scheduling information.

For example, the generating scheduling information based on a correlation between a system information area identity and an area scope includes: when the scheduling information includes the system information area identity, configuring the area scope for one or more SIBs in the scheduling information, or, optionally configuring the area scope for one or more SIBs in the scheduling information, by the network device.

For example, the generating scheduling information based on a correlation between a system information area identity and an area scope further includes: when the scheduling information does not include the system information area identity, not configuring the area scope in the scheduling information by the network device.

For example, the generating scheduling information based on a correlation between a system information area identity and an area scope includes: when the scheduling information includes one or more area scopes configured for one SIB, configuring the system information area identity in the scheduling information by the network device.

For example, the generating scheduling information based on a correlation between a system information area identity and an area scope further includes: when the scheduling information does not include one or more area scopes configured for one SIB, optionally configuring the system information area identity in the scheduling information, or not configuring the system information area identity in the scheduling information, by the network device.

For example, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is optionally present.

For example, a necessary coding condition of the system information area identity field in the scheduling information is that: when the scheduling information includes one or more area scopes configured for one SIB, the system information area identity field is mandatory present; and when the scheduling information does not include one or more area scopes configured for one SIB, the system information area identity field is absent.

For example, the scheduling information includes the system information area identity and the area scope.

For example, the scheduling information is transmitted by broadcast.

For example, the scheduling information is included in SIB1.

In another implementation, the apparatus for configuring system information and the processor 1810 may be configured separately; for example, the apparatus for configuring system information may be configured as a chip connected to the processor 1810, and the functions of the apparatus for configuring system information are executed under control of the processor 1810.

As shown in FIG. 18, the network device 1800 may further include a transceiver 1840, and an antenna 1850, etc. Wherein, functions of the above components are similar to those in the prior art, and shall not be described herein any further. It should be noted that the network device 1800 does not necessarily include all the parts shown in FIG. 18. Furthermore, the network device 1800 may include parts not shown in FIG. 18, and the prior art may be referred to.

It can be seen from the above embodiment that the network device generates the scheduling information based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 11

The embodiment of this disclosure provides a terminal equipment, including the apparatus for acquiring system information as described in Embodiment 7.

Figure 19:
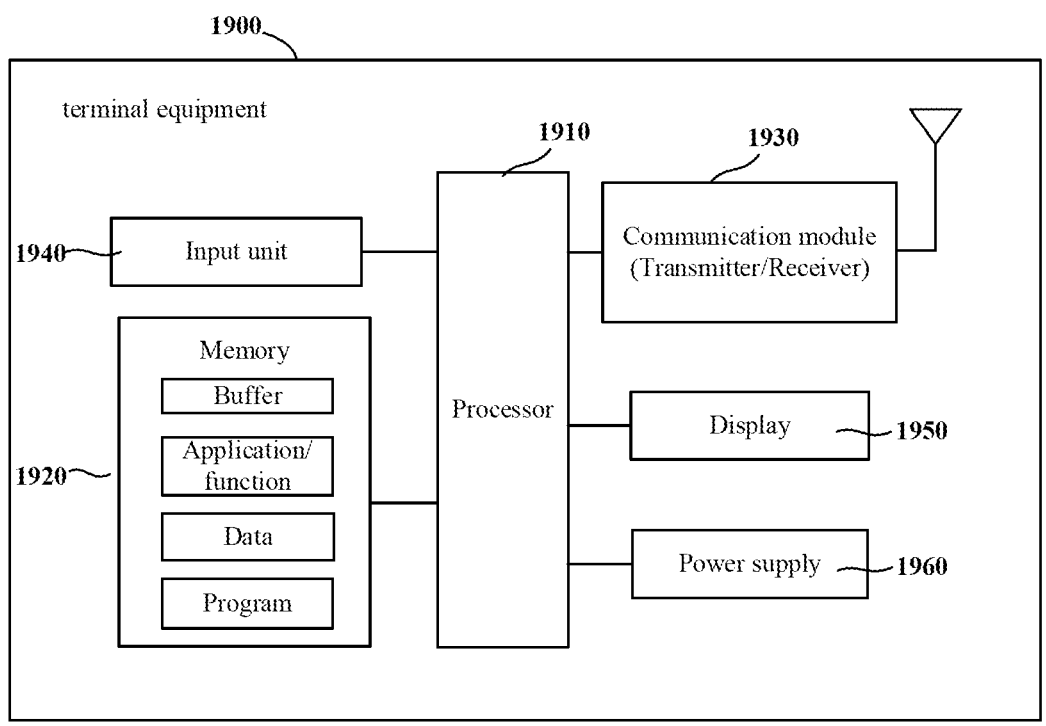
FIG. 19 is a block diagram of a systematic structure of the terminal equipment of Embodiment 11 of this disclosure.

FIG. 19 is a block diagram of a systematic structure of the terminal equipment of Embodiment 11 of this disclosure. As shown in FIG. 19, a terminal equipment 1900 may include a processor 1910 and a memory 1920, the memory 1920 being coupled to the processor 1910. It should be noted that this figure is illustrative only, and other types of structures may also be used, so as to supplement or replace this structure and achieve a telecommunications function or other functions.

In one implementation of this disclosure, the functions of the apparatus for acquiring system information may be integrated into the processor 1910. The processor 1910 may be configured to: acquire scheduling information, the scheduling information being generated based on a correlation between a system information area identity (systemInformationAreaID) and an area scope (areaScope).

For example, the processor 1910 may further be configured to: for one SIB, determine whether a valid version of the SIB is stored according to the scheduling information and other information in system information broadcast by a serving cell.

For example, the determining whether a valid version of the SIB is stored according to the scheduling information and other information in system information broadcast by a serving cell includes: for a stored version of the SIB, when the system information area identity, a value tag (valueTag) associated with the SIB in the scheduling information and a public land mobile network identity (PLMN-Identity) in the other information are identical to a system information area identity, a value tag and a public land mobile network identity associated with the stored version, considering by the terminal equipment that the stored version is valid, or, for a stored version of the SIB, when a value tag (valueTag) associated with the SIB in the scheduling information, a public land mobile network identity (PLMN-Identity) and a cell identity in the other information are identical to a value tag, a public land mobile network identity and a cell identity associated with the stored version, considering by the terminal equipment that the stored version is valid; or for a stored version of the SIB, when the system information area identity, a value tag (valueTag) associated with the SIB in the scheduling information and an NPN identity (NPN-Identity) in the other information are identical to a system information area identity, a value tag and an NPN identity associated with the stored version, considering by the terminal equipment that the stored version is valid, or, for a stored version of the SIB, when a value tag (valueTag) associated with the SIB in the scheduling information, an NPN identity (NPN-Identity) and a cell identity in the other information are identical to a value tag, an NPN identity and a cell identity associated with the stored version, considering by the terminal equipment that the stored version is valid.

For example, the processor 1910 may further be configured to: when a valid version exists, use the valid version of the SIB by the terminal equipment; and when there exists no valid version, transmit a system information request to a network device or acquire the SIB according to the scheduling information, by the terminal equipment.

For example, the scheduling information includes the system information area identity and the area scope.

For example, the SIB may be at least one of SIB2, SIB3, SIB4 and SIB5, and furthermore, the SIB may be at least one of SIB9, SIB10, SIB11, SIB12, SIB13 and SIB14.

For example, the scheduling information is included in SIB1.

In another implementation, the apparatus for acquiring system information and the processor 1910 may be configured separately; for example, the apparatus for acquiring system information may be configured as a chip connected to the processor 1910, and the functions of the apparatus for acquiring system information are executed under control of the processor 1910.

As shown in FIG. 19, the terminal equipment 1900 may further include a communication module 1930, an input unit 1940, a display 1950 and a power supply 1960. It should be noted that the terminal equipment 1900 does not necessarily include all the parts shown in FIG. 19. Furthermore, the terminal equipment 1900 may include parts not shown in FIG. 19, and the prior art may be referred to.

As shown in FIG. 19, the processor 1910 is sometimes referred to as a controller or an operational control, which may include a microprocessor or other processor devices and/or logic devices. The processor 1910 receives input and controls operations of components of the terminal equipment 1900.

Wherein, the memory 1920 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 1910 may execute programs stored in the memory 1920, so as to realize information storage or processing, etc. Functions of other parts are similar to those of the prior art, which shall not be described herein any further. The parts of the terminal equipment 1900 may be realized by specific hardware, firmware, software, or any combination thereof, without departing from the scope of this disclosure.

It can be seen from the above embodiment that the terminal equipment acquires the scheduling information generated by the network device based on the correlation between the system information area identity and the area scope, which may avoid the situation that the area scope is configured but the system information area identity is not configured. Therefore, it may avoid the uncertainty of the behaviors of the terminal equipment, and reduce the complexity of the test and the cost of the terminal equipment.

Embodiment 12

The embodiment of this disclosure provides a terminal equipment, including the apparatus for acquiring system information as described in Embodiment 8.

Figure 20:
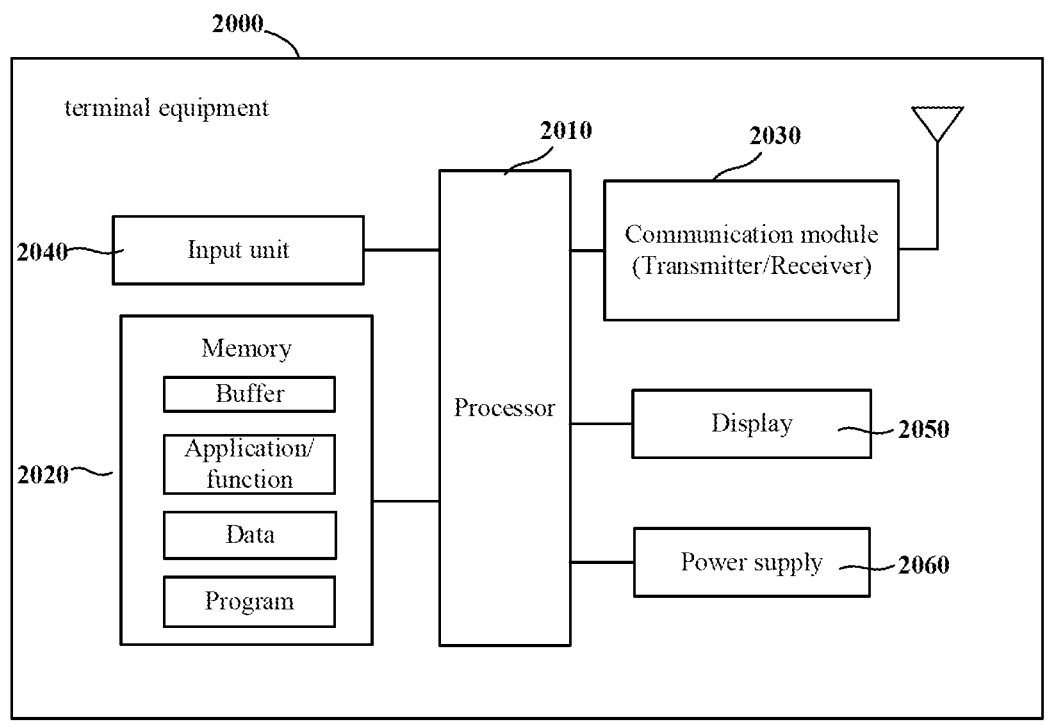
FIG. 20 is a block diagram of a systematic structure of the terminal equipment of Embodiment 12 of this disclosure.

FIG. 20 is a block diagram of a systematic structure of the terminal equipment of Embodiment 12 of this disclosure. As shown in FIG. 20, a terminal equipment 2000 may include a processor 2010 and a memory 2020, the memory 2020 being coupled to the processor 2010. It should be noted that this figure is illustrative only, and other types of structures may also be used, so as to supplement or replace this structure and achieve a telecommunications function or other functions.

In one implementation of this disclosure, the functions of the apparatus for acquiring system information may be integrated into the processor 2010. The processor 2010 may be configured to: for a stored version of an SIB, when obtained scheduling information comprises an area scope (areaScope) corresponding to the SIB, the scheduling information comprises a system information area identity (systemInformationAreaID) and first information are identical to a system information area identity and corresponding information associated with the stored version, considering by the terminal equipment that the stored version is valid.

For example, the processor 2010 may further be configured to: for the stored version of the SIB, when the obtained scheduling information comprises an area scope corresponding to the SIB and the scheduling information does not comprise a system information area identity, considering by the terminal equipment that the stored version is invalid.

For example, the processor 2010 may further be configured to: for the stored version of the SIB, when the obtained scheduling information comprises the area scope corresponding to the SIB, the scheduling information does not comprise an system information area identity and the first information is identical to corresponding information associated with the stored version, considering by the terminal equipment that the stored version is valid.

For example, the processor 2010 may further be configured to: for the stored version of the SIB, when obtained scheduling information comprises an area scope (areaScope) corresponding to the SIB, the scheduling information does not comprise an system information area identity and first information and a cell identity (cellIdentity) are identical to corresponding information and a cell identity associated with the stored version, considering by the terminal equipment that the stored version is valid.

For example, the first information comprises: a first PLMN identity (PLMN-Identity) included in a PLMN identity information list (PLMN-IdentityInfoList) and received from a serving cell, and a value tag (valueTag) associated with the SIB included in the scheduling information; and the corresponding information comprises: a PLMN identity (PLMN-Identity) and a value tag associated with the stored version of the SIB.

For example, when the terminal equipment does not have an NPN capability or a serving cell is not an NPN-only cell, the first information comprises: a first PLMN identity (PLMN-Identity) included in a PLMN identity information list (PLMN-IdentityInfoList) and received from a serving cell, and a value tag (valueTag) associated with the SIB included in the scheduling information; and the corresponding information comprises: a PLMN identity (PLMN-Identity) and a value tag associated with the stored version of the SIB.

For example, the first information comprises: a first PLMN identity included in a PLMN identity information list (PLMN-IdentityInfoList) and received from a serving cell, and a value tag (valueTag) associated with the SIB included in the scheduling information; and the corresponding information comprises: a PLMN identity and a value tag associated with the stored version of the SIB.

For example, when the terminal equipment has an NPN capability and a serving cell is an NPN-only cell, the first information comprises: a first NPN identity included in an NPN identity information list (NPN-IdentityInfoList) and received from a serving cell, and a value tag (valueTag) associated with the SIB included in the scheduling information; and the corresponding information comprises: an NPN identity and a value tag associated with the stored version of the SIB.

For example, the processor 2010 may further be configured to: use a valid version of the SIB when the terminal equipment considers that the stored version is valid; and when there exists no valid version, the terminal equipment transmits a system information request to the network device or acquire the SIB according to the scheduling information.

In another implementation, the apparatus for acquiring system information and the processor 2010 may be configured separately; for example, the apparatus for acquiring system information may be configured as a chip connected to the processor 2010, and the functions of the apparatus for acquiring system information are executed under control of the processor 2010.

As shown in FIG. 20, the terminal equipment 2000 may further include a communication module 2030, an input unit 2040, a display 2050 and a power supply 2060. It should be noted that the terminal equipment 2000 does not necessarily include all the parts shown in FIG. 20. Furthermore, the terminal equipment 2000 may include parts not shown in FIG. 20, and the prior art may be referred to.

As shown in FIG. 20, the processor 2010 is sometimes referred to as a controller or an operational control, which may include a microprocessor or other processor devices and/or logic devices. The processor 2010 receives input and controls operations of components of the terminal equipment 2000.

For example, the memory 2020 may be, for example, one or more of a buffer memory, a flash memory, a hard drive, a mobile medium, a volatile memory, a nonvolatile memory, or other suitable devices, which may store various data, etc., and furthermore, store programs executing related information. And the processor 2010 may execute programs stored in the memory 2020, so as to realize information storage or processing, etc. Functions of other parts are similar to those of the prior art, which shall not be described herein any further. The parts of the terminal equipment 2000 may be realized by specific hardware, firmware, software, or any combination thereof, without departing from the scope of this disclosure.

It can be seen from the above embodiments that when the terminal equipment checks validity of a stored version of an SIB, behaviors of the terminal equipment in case of configuring or not configuring a system information area identity are specified. Hence, uncertainty of the behaviors of the terminal equipment may be avoided, and complexity of test and overhead of the terminal equipment may be lowered.

Embodiment 13

The embodiment of this disclosure provides a network device, including the apparatus for configuring system information as described in Embodiment 9.

Figure 21:
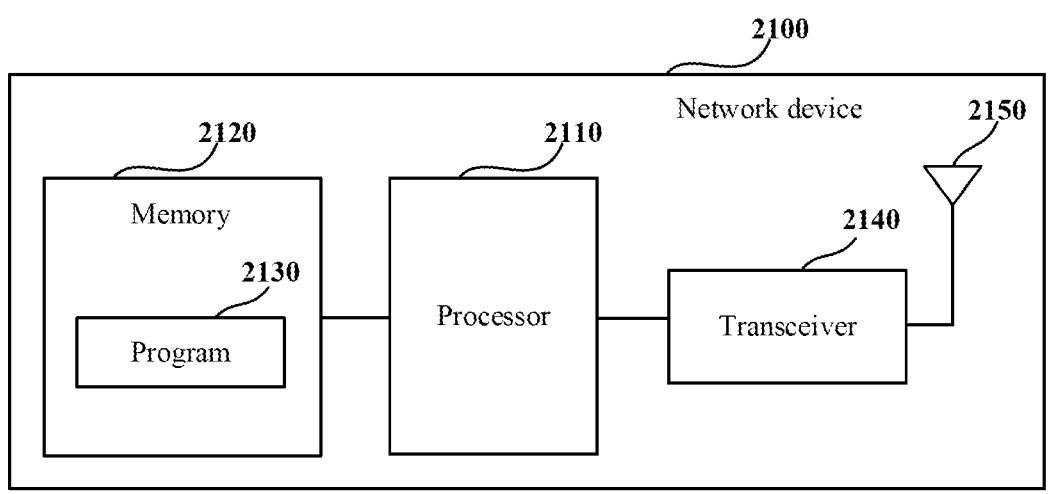
FIG. 21 is a block diagram of a systematic structure of the network device of Embodiment 13 of this disclosure.

FIG. 21 is a block diagram of a systematic structure of the network device of Embodiment 13 of this disclosure. As shown in FIG. 21, network device 2100 may include a processor 2110 and a memory 2120, the memory 2120 being coupled to the processor 2110. The memory 2120 may store various data, and furthermore, it may store a program 2130 for information processing, and execute the program 2130 under control of the processor 2110, so as to receive various information transmitted by a terminal equipment, and transmit various information to the terminal equipment.

In one implementation, the functions of the apparatus for configuring system information may be integrated into the processor 2110. Wherein, processor 2110 may be configured to: for a terminal equipment-specific parameter, when a presence condition comprise that a serving cell is configured with a supplementary uplink, the network device takes a capability of the terminal equipment into account, or, for a terminal equipment-specific parameter and a cell-specific parameter, when the presence condition comprise that a serving cell is configured with a supplementary uplink, the network device does not take a capability of the terminal equipment into account or takes only that a network device provides SUL configuration for the terminal equipment into account.

For example, that the network device takes a capability of the terminal equipment into account includes: determining by the network device based on the capability of the terminal equipment that the terminal equipment is able to support an SUL frequency band provided in the SUL configuration; or, providing the terminal equipment with the SUL configuration by the network device, and determining by the network device based on the capability of the terminal equipment that the terminal equipment is able to support an SUL frequency band provided in the SUL configuration.

For example, that the network device takes a capability of the terminal equipment into account includes: indicating by presence of a supplementary uplink (supplementaryUplink) in a common cell configuration (servingCellConfigCommon) that the network device provides the SUL configuration for the terminal equipment.

For example, the terminal equipment-specific parameter is tpc-Index and/or tpc-IndexSUL.

For example, the terminal equipment-specific parameter is information or an IE or a field.

For example, the terminal equipment-specific parameter may also be terminal equipment-specific information or a terminal equipment-specific IE or a terminal equipment-specific field.

For example, that when the presence condition comprise that a serving cell is configured with a supplementary uplink, the network device does not take a capability of the terminal equipment into account or takes only that a network device provides SUL configuration for the terminal equipment into account, includes: when a supplementary uplink configuration is present in the cell-common first configuration information, optionally providing the configuration on the supplementary uplink for transmission of the system information message (for example, si-RequestConfigSUL, posSI-RequestConfigSUL-r16) in the scheduling information.

For example, the first configuration information is serving cell-common configuration (servingCellConfigCommon).

For example, when a supplementary uplink is present in the cell-common configuration (servingCellConfigCommon) and when a system information broadcast status (such as si-BroadcastStatus, posSI-BroadcastStatus) of any system information message (SI-message) in the scheduling information (SchedulingInfo) is set to be not broadcasting, the configuration (such as si-RequestConfigSUL, posSI-RequestConfigSUL-R16) for transmission of the system information message on the supplementary uplink is optionally provided.

For example, a presence condition of the configuration on the supplementary uplink for transmission of the system information message is that: when a supplementary uplink (supplementaryUplink) is present in the serving cell-common configuration (servingCellConfigCommon) and when a system information broadcast status of any system information message (SI-message) in the scheduling information (SchedulingInfo) is set to be not broadcast, the configuration on the supplementary uplink for transmission of the system information message is present optionally, otherwise, the configuration on the supplementary uplink for transmission of the system information message is vacant.

For example, the scheduling information is included in SIB1.

In another implementation, the apparatus for configuring system information and the processor 2110 may be configured separately; for example, the apparatus for configuring system information may be configured as a chip connected to the processor 2110, and the functions of the apparatus for configuring system information are executed under control of the processor 2110.

Furthermore, as shown in FIG. 21, the network device 2100 may include a transceiver 2140, and an antenna 2150, etc. Functions of the above components are similar to those in the prior art, and shall not be described herein any further. It should be noted that the network device 2100 does not necessarily include all the parts shown in FIG. 21. Furthermore, the network device 2100 may include parts not shown in FIG. 21, and the prior art may be referred to.

It can be seen from the above embodiment that for a terminal equipment-specific parameter, when a presence condition includes that the serving cell configures supplementary uplink, capabilities of the terminal equipment are taken into account, or for a terminal equipment-specific parameter and a cell-specific parameter, when a presence condition includes that the serving cell configures supplementary uplink, capabilities of the terminal equipment are not taken into account, or that the network device provides SUL configuration for the terminal equipment is only taken into account. In this way, the network device is able to specify contents in SIB1, uncertainty of implementations of the network device may be avoided, and testing costs of network device products may be lowered, thereby saving networking costs.

Embodiment 14

The embodiment of this disclosure provides a communication system, including the network device described in Embodiment 10 and/or the terminal equipment described in Embodiment 11, or including the terminal equipment described in Embodiment 12, or including the network device described in Embodiment 13.

For example, reference may be made to FIG. 1 for a structure of the communication system. As shown in FIG. 1, the communication system 100 includes a network device 101 and a terminal equipment 102. The network device 101 is identical to the network device in Embodiment 10 or Embodiment 13, and/or, the terminal equipment 102 is identical to the terminal equipment described in Embodiment 11 or Embodiment 12, with identical contents being not going to be described herein any further.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 13 may either correspond to software modules of procedures of a computer program, or correspond to hardware modules. Such software modules may respectively correspond to the steps shown in FIG. 3. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, when equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 13 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 13 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments, following supplements are further disclosed.

Supplement I

1. An apparatus for configuring system information, applicable to a network device, the apparatus comprising:
   a generating unit configured to generate scheduling information (SchedulingInfo) based on a correlation between a system information area identity (systemInformationAreaID) and an area scope (areaScope); and
   a transmitting unit configured to transmit the scheduling information.

2. The apparatus according to supplement 1, wherein,
   when the scheduling information comprises the system information area identity, the generating unit configures the area scope for one or more SIBs in the scheduling information, or, optionally configures the area scope for one or more SIBs in the scheduling information.

3. The apparatus according to supplement 2, wherein,
   when the scheduling information does not comprise the system information area identity, the generating unit does not configure the area scope in the scheduling information.

4. The apparatus according to any one of supplements 1-3, wherein,
   a necessary coding condition of the system information area identity field in the scheduling information is that:
   when the scheduling information includes the system information area identity, the area scope field is mandatorily present; and when the scheduling information does not include the system information area identity, the area scope field is absent; or,
   when the scheduling information includes the system information area identity, the area scope field is optionally present; and when the scheduling information does not include the system information area identity, the area scope field is absent.

5. The apparatus according to supplement 1, wherein,
   when the scheduling information comprises one or more area scopes configured for one SIB, the generating unit configures the system information area identity in the scheduling information.

6. The apparatus according to supplement 5, wherein,
   when the scheduling information does not comprise one or more area scopes configured for one SIB, the generating unit optionally configures the system information area identity in the scheduling information, or does not configure the system information area identity in the scheduling information.

7. The apparatus according to any one of supplements 1, 5 and 6, wherein,
   a necessary coding condition of the system information area identity field in the scheduling information is that:
   when the scheduling information comprises one or more area scopes configured for one SIB, the system information area identity field is mandatory present; and
   when the scheduling information does not comprise one or more area scopes configured for one SIB, the system information area identity field is optionally present.

8. The apparatus according to any one of supplements 1, 5 and 6, wherein,
   a necessary coding condition of the system information area identity field in the scheduling information is that:
   when the scheduling information comprises one or more area scopes configured for one SIB, the system information area identity field is mandatory present; and
   when the scheduling information does not comprise one or more area scopes configured for one SIB, the system information area identity field is absent.

9. The apparatus according to any one of supplements 1-2 and 4-8, wherein,
   the scheduling information includes the system information area identity and the area scope.

10. The apparatus according to any one of supplements 1-9, wherein,
    the scheduling information is transmitted by broadcast.

11. The apparatus according to any one of supplements 1-10, wherein,
    the scheduling information is included in SIB1.

12. An apparatus for acquiring system information, applicable to a terminal equipment, the apparatus comprising:
    a first acquiring unit configured to acquire scheduling information, the scheduling information being generated based on a correlation between a system information area identity (systemInformationAreaID) and an area scope (areaScope).

13. The apparatus according to supplement 12, wherein the apparatus further comprises:
    a first determining unit configured to, for one SIB, determine whether a valid version of the SIB is stored according to the scheduling information and other information in system information broadcast by a serving cell.

14. The apparatus according to supplement 13, wherein the first determining unit comprises:
    a second determining unit configured to, for a stored version of the SIB, when the system information area identity, a value tag (valueTag) associated with the SIB in the scheduling information and a public land mobile network identity (PLMN-Identity) in the other information are identical to a system information area identity, a value tag and a public land mobile network identity associated with the stored version, consider that the stored version is valid, or, for a stored version of the SIB, when a value tag (valueTag) associated with the SIB in the scheduling information, a public land mobile network identity (PLMN-Identity) and a cell identity in the other information are identical to a value tag, a public land mobile network identity and a cell identity (cellIdentity) associated with the stored version, consider that the stored version is valid; or
    a third determining unit configured to, for a stored version of the SIB, when the system information area identity, a value tag associated with the SIB in the scheduling information and an NPN identity (NPN-Identity) in the other information are identical to a system information area identity, a value tag and an NPN identity associated with the stored version, consider that the stored version is valid, or, for a stored version of the SIB, when a value tag associated with the SIB in the scheduling information, an NPN identity (NPN-Identity) and a cell identity in the other information are identical to a value tag, an NPN identity and a cell identity associated with the stored version, consider that the stored version is valid.

15. The apparatus according to supplement 13 or 14, wherein the apparatus further comprises:
    a first using unit configured to, when a valid version exists, use the valid version of the SIB; and
    a second acquiring unit configured to, when there exists no valid version, transmit a system information request to a network device or acquire the SIB according to the scheduling information.

16. The apparatus according to any one of supplements 12-15, wherein,
the scheduling information includes the system information area identity and the area scope.

17. The apparatus according to any one of supplements 13-16, wherein,
the SIB is at least one of SIB2, SIB3, SIB4 and SIB5.

18. The apparatus according to any one of supplements 12-17, wherein,
the scheduling information is included in SIB1.

19. An apparatus for acquiring system information, applicable to a terminal equipment, the apparatus comprising:
a fourth determining unit configured to, for a stored version of an SIB, when obtained scheduling information comprises an area scope (areaScope) corresponding to the SIB, the scheduling information comprises a system information area identity (systemInformationAreaID) and first information are identical to a system information area identity and corresponding information associated with the stored version, consider that the stored version is valid.

20. The apparatus according to supplement 19, wherein the apparatus further comprises:
a fifth determining unit configured to, for the stored version of the SIB, when the obtained scheduling information comprises an area scope corresponding to the SIB and the scheduling information does not comprise a system information area identity, consider that the stored version is invalid.

21. The apparatus according to supplement 19, wherein the apparatus further comprises:
a sixth determining unit configured to, for the stored version of the SIB, when the obtained scheduling information comprises the area scope corresponding to the SIB, the scheduling information does not comprise an system information area identity and the first information is identical to corresponding information associated with the stored version, consider that the stored version is valid.

22. The apparatus according to supplement 19, wherein the apparatus further comprises:
a seventh determining unit configured to, for the stored version of the SIB, when obtained scheduling information comprises an area scope (areaScope) corresponding to the SIB, the scheduling information does not comprise an system information area identity and first information and a cell identity (cellIdentity) are identical to corresponding information and a cell identity associated with the stored version, consider that the stored version is valid.

23. The apparatus according to any one of supplements 19-22, wherein,
the first information comprises: a first PLMN identity (PLMN-Identity) included in a PLMN identity information list (PLMN-IdentityInfoList) and received from a serving cell, and a value tag (valueTag) associated with the SIB included in the scheduling information;
and the corresponding information comprises: a PLMN identity (PLMN-Identity) and a value tag associated with the stored version of the SIB.

24. The apparatus according to any one of supplements 19-23, wherein,
when the terminal equipment does not have an NPN capability or a serving cell is not an NPN-only cell,
the first information comprises: a first PLMN identity (PLMN-Identity) included in a PLMN identity information list (PLMN-IdentityInfoList) and received from a serving cell, and a value tag (valueTag) associated with the SIB included in the scheduling information;
and the corresponding information comprises: a PLMN identity (PLMN-Identity) and a value tag associated with the stored version of the SIB.

25. The apparatus according to any one of supplements 19-22, wherein,
the first information comprises: a first PLMN identity included in a PLMN identity information list (PLMN-IdentityInfoList) and received from a serving cell, and a value tag (valueTag) associated with the SIB included in the scheduling information;
and the corresponding information comprises: a PLMN identity and a value tag associated with the stored version of the SIB.

26. The apparatus according to any one of supplements 19-22 and 25, wherein,
when the terminal equipment has an NPN capability and a serving cell is an NPN-only cell,
the first information comprises: a first NPN identity included in an NPN identity information list (NPN-IdentityInfoList) and received from a serving cell, and a value tag (valueTag) associated with the SIB included in the scheduling information;
and the corresponding information comprises: an NPN identity and a value tag associated with the stored version of the SIB.

27. The apparatus according to any one of supplements 19-26, wherein the apparatus further comprises:
a second using unit configured to use a valid version of the SIB when the terminal equipment considers that the stored version is valid; and
a third acquiring unit configured to, when there exists no valid version, the terminal equipment transmits a system information request to the network device or acquire the SIB according to the scheduling information.

33. A network device, comprising the apparatus as described in any one of supplements 1-11.

34. A terminal equipment, comprising the apparatus as described in any one of supplements 12-27.

35. A communication system, comprising the network device as described in supplement 33 and/or the terminal equipment as described in supplement 34.

36. A method for configuring system information, applicable to a network device, the method comprising:
generating scheduling information (SchedulingInfo) based on a correlation between a system information area identity (systemInformationAreaID) and an area scope (areaScope); and
transmitting the scheduling information.

37. The method according to supplement 36, wherein the generating scheduling information based on a correlation between a system information area identity and an area scope comprises:
when the scheduling information comprises the system information area identity, configuring the area scope for one or more SIBs in the scheduling information, or, optionally configuring the area scope for one or more SIBs in the scheduling information, by the network device.

38. The method according to supplement 37, wherein the generating scheduling information based on a correlation between a system information area identity and an area scope further comprises:

when the scheduling information does not comprise the system information area identity, not configuring the area scope in the scheduling information by the network device.

39. The method according to any one of supplements 36-38, wherein,
a necessary coding condition of the system information area identity field in the scheduling information is that:
when the scheduling information includes the system information area identity, the area scope field is mandatorily present; and when the scheduling information does not include the system information area identity, the area scope field is absent; or,
when the scheduling information includes the system information area identity, the area scope field is optionally present; and when the scheduling information does not include the system information area identity, the area scope field is absent.

40. The method according to supplement 36, wherein the generating scheduling information based on a correlation between a system information area identity and an area scope comprises:
when the scheduling information comprises one or more area scopes configured for one SIB, configuring the system information area identity in the scheduling information by the network device.

41. The method according to supplement 40, wherein the generating scheduling information based on a correlation between a system information area identity and an area scope further comprises:
when the scheduling information does not comprise one or more area scopes configured for one SIB, optionally configuring the system information area identity in the scheduling information, or not configuring the system information area identity in the scheduling information, by the network device.

42. The method according to any one of supplements 36, 40 and 41, wherein,
a necessary coding condition of the system information area identity field in the scheduling information is that:
when the scheduling information comprises one or more area scopes configured for one SIB, the system information area identity field is mandatory present; and
when the scheduling information does not comprise one or more area scopes configured for one SIB, the system information area identity field is optionally present.

43. The method according to any one of supplements 36, 40 and 41, wherein,
a necessary coding condition of the system information area identity field in the scheduling information is that:
when the scheduling information comprises one or more area scopes configured for one SIB, the system information area identity field is mandatory present; and
when the scheduling information does not comprise one or more area scopes configured for one SIB, the system information area identity field is absent.

44. The method according to any one of supplements 36-37 and 39-43, wherein,
the scheduling information includes the system information area identity and the area scope.

45. The method according to any one of supplements 36-44, wherein,
the scheduling information is transmitted by broadcast.

46. The method according to any one of supplements 36-45, wherein,
the scheduling information is included in SIB1.

47. A method for acquiring system information, applicable to a terminal equipment, the method comprising:
acquiring scheduling information, the scheduling information being generated based on a correlation between a system information area identity (systemInformation-AreaID) and an area scope (areaScope).

48. The method according to supplement 47, wherein the method further comprises:
for one SIB, determining whether a valid version of the SIB is stored according to the scheduling information and other information in system information broadcast by a serving cell.

49. The method according to supplement 48, wherein the determining whether a valid version of the SIB is stored according to the scheduling information and other information in system information broadcast by a serving cell comprises:
for a stored version of the SIB, when the system information area identity, a value tag (valueTag) associated with the SIB in the scheduling information and a public land mobile network identity (PLMN-Identity) in the other information are identical to a system information area identity, a value tag and a public land mobile network identity associated with the stored version, considering by the terminal equipment that the stored version is valid, or, for a stored version of the SIB, when a value tag (valueTag) associated with the SIB in the scheduling information, a public land mobile network (identity (PLMN-Identity) and a cell identity in the other information are identical to a value tag, a public land mobile network identity and a cell identity associated with the stored version, considering by the terminal equipment that the stored version is valid; or
for a stored version of the SIB, when the system information area identity, a value tag (valueTag) associated with the SIB in the scheduling information and an NPN identity (NPN-Identity) in the other information are identical to a system information area identity, a value tag and an NPN identity associated with the stored version, considering by the terminal equipment the stored version is valid, or, for a stored version of the SIB, when a value tag (valueTag) associated with the SIB in the scheduling information, an NPN identity (NPN-Identity) and a cell identity in the other information are identical to a value tag, an NPN identity and a cell identity associated with the stored version, considering by the terminal equipment that the stored version is valid.

50. The method according to supplement 48 or 49, wherein the method further comprises:
when a valid version exists, using the valid version of the SIB by the terminal equipment; and
when there exists no valid version, transmitting a system information request to a network device or acquiring the SIB according to the scheduling information by the terminal equipment.

51. The method according to any one of supplements 47-50, wherein,
the scheduling information includes the system information area identity and the area scope.

52. The method according to any one of supplements 48-51, wherein,
the SIB is at least one of SIB2, SIB3, SIB4 and SIB5.

53. The method according to any one of supplements 47-52, wherein,
the scheduling information is included in SIB1.

54. A method for acquiring system information, applicable to a terminal equipment, the method comprising:
for a stored version of an SIB, when obtained scheduling information comprises an area scope (areaScope) corresponding to the SIB, the scheduling information comprises a system information area identity (systemInformationAreaID) and first information are identical to a system information area identity and corresponding information associated with the stored version, considering by the terminal equipment that the stored version is valid.

55. The method according to supplement 54, wherein the method further comprises:
for the stored version of the SIB, when the obtained scheduling information comprises an area scope corresponding to the SIB and the scheduling information does not comprise a system information area identity, considering by the terminal equipment that the stored version is invalid.

56. The method according to supplement 54, wherein the method further comprises:
for the stored version of the SIB, when the obtained scheduling information comprises the area scope corresponding to the SIB, the scheduling information does not comprise an system information area identity and the first information is identical to corresponding information associated with the stored version, considering by the terminal equipment that the stored version is valid.

57. The method according to supplement 54, wherein the method further comprises:
for the stored version of the SIB, when obtained scheduling information comprises an area scope (areaScope) corresponding to the SIB, the scheduling information does not comprise an system information area identity and first information and a cell identity (cellIdentity) are identical to corresponding information and a cell identity associated with the stored version, considering by the terminal equipment that the stored version is valid.

58. The method according to any one of supplements 54-57, wherein,
the first information comprises: a first PLMN identity (PLMN-Identity) included in a PLMN identity information list (PLMN-IdentityInfoList) and received from a serving cell, and a value tag (valueTag) associated with the SIB included in the scheduling information;
and the corresponding information comprises: a PLMN identity (PLMN-Identity) and a value tag associated with the stored version of the SIB.

59. The method according to any one of supplements 54-58, wherein,
when the terminal equipment does not have an NPN capability or a serving cell is not an NPN-only cell,
the first information comprises: a first PLMN identity (PLMN-Identity) included in a PLMN identity information list (PLMN-IdentityInfoList) and received from a serving cell, and a value tag (valueTag) associated with the SIB included in the scheduling information;
and the corresponding information comprises: a PLMN identity (PLMN-Identity) and a value tag associated with the stored version of the SIB.

60. The method according to any one of supplements 54-57, wherein,
the first information comprises: a first PLMN identity included in a NPN identity information list (NPN-IdentityInfoList) and received from a serving cell, and a value tag (valueTag) associated with the SIB included in the scheduling information;
and the corresponding information comprises: a NPN identity and a value tag associated with the stored version of the SIB.

61. The method according to any one of supplements 54-57 and 60, wherein,
when the terminal equipment has an NPN capability and a serving cell is an NPN-only cell,
the first information comprises: a first NPN identity included in an NPN identity information list (NPN-IdentityInfoList) and received from a serving cell, and a value tag (valueTag) associated with the SIB included in the scheduling information;
and the corresponding information comprises: an NPN identity and a value tag associated with the stored version of the SIB.

62. The method according to any one of supplements 54-61, wherein the method further comprises:
using the valid version of the SIB when the terminal equipment considers that the stored version is valid; and
when there exists no valid version, transmitting a system information request to the network device or acquiring the SIB according to the scheduling information by the terminal equipment.

Supplement II

1. An apparatus for configuring system information, applicable to a network device, the apparatus comprising:
a configuring unit configured to, for a terminal equipment-specific parameter, when a presence condition comprises that a serving cell is configured with a supplementary uplink, take a capability of the terminal equipment into account, or, for a terminal equipment-specific parameter and a cell-specific parameter, when the presence condition comprises that a serving cell is configured with a supplementary uplink, not to take a capability of the terminal equipment into account or take only that a network device provides SUL (Supplementary Uplink) configuration for the terminal equipment into account.

2. The apparatus according to supplement 1, wherein that the network device takes a capability of the terminal equipment into account comprises:
determining by the network device based on the capability of the terminal equipment that the terminal equipment is able to support an SUL frequency band provided in the SUL configuration; or,
providing the terminal equipment with the SUL configuration by the network device, and determining by the network device based on the capability of the terminal equipment that the terminal equipment is able to support an SUL frequency band provided in the SUL configuration.

3. The apparatus according to supplement 1 or 2, wherein that the network device takes a capability of the terminal equipment into account comprises:
indicating by presence of a supplementary uplink (supplementaryUplink) in a common cell configuration (servingCellConfigCommon) that the network device provides the SUL configuration for the terminal equipment.

4. The apparatus according to supplement 1, wherein,
the terminal equipment-specific parameter is tpc-Index and/or tpc-IndexSUL.

5. The apparatus according to any one of supplements 1-3, wherein,
the terminal equipment-specific parameter is information or an IE or a field.

6. The apparatus according to any one of supplements 1-5, wherein that when the presence condition comprises that a serving cell is configured with a supplementary uplink, not to take a capability of the terminal equipment into account or take only that the network device provides SUL configuration for the terminal equipment into account, comprises:
in scheduling information, optionally providing configuration on the supplementary uplink for transmission of a system information message when cell-common first configuration information comprises the supplementary uplink configuration.

7. The apparatus according to any one of supplements 1-6, wherein,
the first configuration information is serving cell-common configuration (servingCellConfigCommon).

8. The apparatus according to any one of supplements 1-7, wherein,
when a supplementary uplink (supplementaryUplink) is present in the serving cell-common configuration (servingCellConfigCommon) and when a system information broadcast status of any system information message (SI-message) in the scheduling information (SchedulingInfo) is set to be not broadcast, in the scheduling information, the configuring unit optionally provides the configuration on the supplementary uplink for transmission of the system information message.

9. The apparatus according to any one of supplements 1-8, wherein a presence condition of the configuration on the supplementary uplink for transmission of the system information message is that:
when a supplementary uplink (supplementaryUplink) is present in the serving cell-common configuration (servingCellConfigCommon) and when a system information broadcast status (si-BroadcastStatus) of any system information message (SI-message) in the scheduling information (SchedulingInfo) is set to be not broadcast, the configuration on the supplementary uplink for transmission of the system information message is present optionally, otherwise, the configuration on the supplementary uplink for transmission of the system information message is vacant.

10. The apparatus according to any one of supplements 1-9, wherein,
the scheduling information is included in SIB1.

11. A network device, comprising the apparatus as described in any one of supplements 1-10.

12. A communication system, comprising the network device as described in supplement 11.

13. A method for configuring system information, applicable to a network device, the method comprising:
for a terminal equipment-specific parameter, when a presence condition comprise that a serving cell is configured with a supplementary uplink, taking a capability of the terminal equipment into account by the network device, or,
for a terminal equipment-specific parameter and a cell-specific parameter, when the presence condition comprise that a serving cell is configured with a supplementary uplink, not taking a capability of the terminal equipment into account by the network device or taking only that a network device provides SUL (Supplementary Uplink) configuration for the terminal equipment into account by the network device.

14. The method according to supplement 13, wherein the taking a capability of the terminal equipment into account by the network device comprises:
determining by the network device based on the capability of the terminal equipment that the terminal equipment is able to support an SUL frequency band provided in the SUL configuration; or,
providing the terminal equipment with the SUL configuration by the network device, and determining by the network device based on the capability of the terminal equipment that the terminal equipment is able to support an SUL frequency band provided in the SUL configuration.

15. The method according to supplement 13 or 14, wherein the taking a capability of the terminal equipment into account by the network device comprises:
indicating by presence of a supplementary uplink (supplementaryUplink) in a common cell configuration (servingCellConfigCommon) that the network device provides the SUL configuration for the terminal equipment.

16. The method according to supplement 13, wherein,
the terminal equipment-specific parameter is tpc-Index and/or tpc-IndexSUL.

17. The method according to any one of supplements 13-15, wherein,
the terminal equipment-specific parameter is information or an IE or a field.

18. The method according to any one of supplements 13-17, wherein when the presence condition comprise that a serving cell is configured with a supplementary uplink, not taking a capability of the terminal equipment into account or taking only that the network device provides SUL configuration for the terminal equipment into account, comprises:
in scheduling information, optionally providing configuration on the supplementary uplink for transmission of a system information message (si-RequestConfigSUL) when cell-common first configuration information comprises the supplementary uplink configuration.

19. The method according to supplement 18, wherein,
the first configuration information is serving cell-common configuration (servingCellConfigCommon).

20. The method according to any one of supplements 13-19, wherein,
when a supplementary uplink (supplementaryUplink) is present in the serving cell-common configuration (servingCellConfigCommon) and when a system information broadcast status of any system information message (SI-message) in the scheduling information (SchedulingInfo) is set to be not broadcast, the configuration on the supplementary uplink for transmission of the system information message is optionally provided in the scheduling information.

21. The method according to any one of supplements 13-20, wherein a presence condition of the configuration on the supplementary uplink for transmission of the system information message is that:
when a supplementary uplink (supplementaryUplink) is present in the serving cell-common configuration (servingCellConfigCommon) and when a system information broadcast status (si-BroadcastStatus) of any system information message (SI-message) in the scheduling information (SchedulingInfo) is set to be not broadcast, the configuration on the supplementary uplink for transmission of the system information message is present optionally, otherwise, the configuration on the supplementary uplink for transmission of the system information message is vacant.

22. The method according to any one of supplements 13-21, wherein,
the scheduling information is included in SIB1.

What is claimed is:

1. An apparatus for configuring system information, applicable to a network device, the apparatus comprising:
a memory; and
processor circuitry coupled to the memory and configured to:
for a cell-specific parameter, provide configuration on supplementary uplink for transmission of a system information message in scheduling information comprised in SIB1 when servingCellConfigCommon comprises supplementary uplink configuration; and
wherein when the supplementary uplink (supplementaryUplink) is present in the serving cell-common configuration (servingCellConfigCommon) and when a system information broadcast status for any system information message (SI-message) in the scheduling information (SchedulingInfo) is set to be not broadcasted, in the scheduling information, the processor circuitry is configured to provide the configuration on the supplementary uplink for transmission of the system information message.

2. The apparatus according to claim 1, wherein,
the processor circuitry is further configured to, wherein the cell-specific parameter is information or an IE or a field, provide the configuration on the supplementary uplink for transmission of the system information message.

3. A communication system, comprising:
a network device configured to, for a cell-specific parameter, provide configuration on supplementary uplink for transmission of a system information message in scheduling information comprised in SIB1 when servingCellConfigCommon comprises supplementary uplink configuration; and
a terminal device configured to receive the SIB 1 comprising configuration on the supplementary uplink for transmission of a system information message in scheduling information, the configuration being provided for a cell-specific parameter when servingCellConfigCommon comprises the supplementary uplink configuration;
wherein when the supplementary uplink (supplementaryUplink) is present in the serving cell-common configuration (servingCellConfigCommon) and when a system information broadcast status for any system information message (SI-message) in the scheduling information (SchedulingInfo) is set to be not broadcasted, in the scheduling information, the network device is configured to provide the configuration on the supplementary uplink for transmission of the system information message.

4. An apparatus for configuring system information, applicable to a network device, the apparatus comprising:
a memory; and
processor circuitry coupled to the memory and configured to,
for a terminal equipment-specific parameter, provide configuration of the terminal equipment-specific parameter on supplementary uplink when configuration on the supplementary uplink is provided by the network device for a terminal equipment-;
wherein configuration on the supplementary uplink is provided by the network device for the terminal equipment comprises presence of a supplementary uplink (supplementaryUplink) in a common cell configuration (servingCellConfigCommon).

5. The apparatus according to claim 4, wherein,
the terminal equipment-specific parameter comprises tpc-Index and/or tpc-IndexSUL.

6. The apparatus according to claim 4, wherein,
the processor circuitry is further configured to, wherein the terminal equipment-specific parameter is information or an IE or a field, provide the configuration on the supplementary uplink for transmission of the system information message.

* * * * *